(12) United States Patent
Oowaki et al.

(10) Patent No.: US 8,726,368 B2
(45) Date of Patent: *May 13, 2014

(54) SECURITY MANAGEMENT SYSTEM, MEDICAL DEVICE AND METHOD FOR MANAGING SECURITY

(75) Inventors: Naoki Oowaki, Otawara (JP); Fumiaki Teshima, Nasushiobara (JP)

(73) Assignees: Kabushiki Kaisha Toshiba, Tokyo (JP); Toshiba Medical Systems Corporation, Otawara-Shi (JP)

( * ) Notice: Subject to any disclaimer, the term of this patent is extended or adjusted under 35 U.S.C. 154(b) by 51 days.

This patent is subject to a terminal disclaimer.

(21) Appl. No.: 13/251,854

(22) Filed: Oct. 3, 2011

(65) Prior Publication Data
US 2012/0030754 A1    Feb. 2, 2012

Related U.S. Application Data

(62) Division of application No. 11/281,587, filed on Nov. 18, 2005, now Pat. No. 8,074,273.

(30) Foreign Application Priority Data

Nov. 19, 2004    (JP) .................................. 2004-336347

(51) Int. Cl.
*G06F 21/00*    (2013.01)
(52) U.S. Cl.
USPC ............................................. 726/17; 128/922

(58) Field of Classification Search
None
See application file for complete search history.

(56) References Cited

U.S. PATENT DOCUMENTS

| 5,237,614 | A | 8/1993 | Weiss | |
|---|---|---|---|---|
| 2005/0085215 | A1 | 4/2005 | Kokko et al. | |
| 2005/0240613 | A1* | 10/2005 | Logan | 707/102 |
| 2006/0095950 | A1 | 5/2006 | Coonce et al. | |

* cited by examiner

*Primary Examiner* — Gilberto Barron, Jr.
*Assistant Examiner* — Simon Kanaan
(74) *Attorney, Agent, or Firm* — Oblon, Spivak, McClelland, Maier & Neustadt, L.L.P.

(57) ABSTRACT

A security management system, comprising: an authentication unit for authenticating an operator of an operating terminal in order to determine whether the operator is permitted to log in or release a lock; a current operator information inquiry unit for inquiring for login status information and current operator information; an authority information inquiry unit for inquiring for authority information regarding the operator and that regarding the current operator; a lock unit for detecting an event, where a predetermined lock condition is satisfied, in the login status to allow the operating terminal to change to a lock status, and for allowing the operating terminal to change to an operable status in response to a login instruction or an instruction for a release; and a lock control unit for transmitting the instruction for a release to the lock unit when a predetermined condition is satisfied.

6 Claims, 11 Drawing Sheets

SECURITY MANAGEMENT SYSTEM, MEDICAL DEVICE AND METHOD FOR MANAGING SECURITY

CROSS-REFERENCE TO RELATED APPLICATIONS

This application is a divisional application of and claims the benefit of priority under 35 U.S.C. §120 from U.S. application Ser. No. 11/281,587, filed Nov. 18, 2005, the entire contents of which is incorporated herein by reference. U.S. application Ser. No. 11/281,587 is based upon and claims the benefit of priority under 35 U.S.C. §119 from prior Japanese Patent Application No. 2004-336347, filed Nov. 19, 2004.

BACKGROUND OF THE INVENTION

1. Field of the Invention

The present invention relates to a security management system, a medical device and a security managing method, the device and method being capable of ensuring security management in accordance with the authority of a user (operator) or a user group when the user or user group logs into or logs off an operating terminal, or releases an operating screen lock, and more particularly, the system, device and method being capable of responding to demands specific to medical services 2. Description of the Related Art Hitherto, security management for access to data (information) stored in various systems, such as computers, has been performed. According to known security management techniques, a user or a group that the user belongs to is permitted to operate predetermined functions. In other words, the user or group is authorized to login to a predetermined device and perform processing, e.g., read, write, or delete data, or execute other processing.

According to one of the above-mentioned techniques (e.g., Non-patent Document 1), security policies are managed and a login prompt accompanying authentication by the identical code(ID) and password of a user is performed. When an operating terminal of a computer is not operated for predetermined time, the screen of a display device is locked so that others cannot operate the computer, thus preventing unauthorized access to various pieces of data.

For instance, a commercial operating system capable of setting an executable function every group to which a user belongs to is realized. According to this system, a user or a user group, which is authorized to log in to the system and perform processing, e.g., write, read, or delete data, or execute other processing, can be set every file or directory. In this case, to operate the system through an operating terminal, the user or user group has to login with authentication. When the user terminates the system operation, the user has to logout. To operate the system next time, the user has to again login with authentication.

In addition to the above login/logout functions, the operating terminal provides a function of activating a screen saver to lock the screen of a display device when the operating terminal of the system is not operated for predetermined time or a predetermined key is operated. According to this function, any other users cannot operate the system unless the logined (logged-in) user releases the screen lock with authentication in the same way as in login.

However, to protect information, e.g., personal information regarding patients, stored in a medical device, such as a medical image diagnostic device or a hospital information system (HIS), or restrict persons permitted to operate the medical device, when a user (operator) or a group that the user belongs to is authenticated to login to the device and the authority corresponding to that logined user is authorized to login or release an screen lock in a manner similar to the known security management techniques, various problems occur.

First, in general medical image diagnostic devices, an examination or a diagnosis has to be available at any time. Therefore, the following security management is impermissible: While a screen saver is activated on an operating terminal and an operating screen is locked, an only logined user can release the screen lock. In the above security management, if the user who operates the operating terminal omits to release the screen lock and leaves the terminal, an examination or a diagnosis using the medical image diagnostic device cannot be performed.

According to the known security management techniques, an only logined user can release the screen lock. Disadvantageously, security management responding to demands specific to the above-mentioned medical services cannot be ensured.

Second, differently from general electronic equipment, in many medical image diagnostic devices, it is undesirable to turn off the device or terminate a system because the operating screen of an operating terminal is locked. The reason is as follows: In the medical image diagnostic device, it is necessary to immediately start an examination when a patient arrived. If the device is turned off or the system is terminated, it takes much time to restart the system. Disadvantageously, it is difficult to immediately start an examination.

According to the known security management techniques, when a different user wants to use the system while an operating screen is locked, that user cannot release the screen lock. Therefore, in order to permit a different user to operate the medical image diagnostic device, the device has to be turned off, alternatively, the system has to be terminated.

Third, it is necessary to permit a non-enrolled user, who is not authorized to login yet, to operate the medical image diagnostic device and urgently perform an examination using the device. However, according to the known security management techniques, even when the non-enrolled user has to urgently perform an examination, the user cannot login to the medical image diagnostic device because he or she is not authorized to login.

Fourth, according to the known security management techniques, if a user wants to logout the medical image diagnostic device and again login to the device, a diagnostic application of the medical image diagnostic device has to be restarted each time the user logins to the device. Disadvantageously, it takes much time to restart the diagnostic application. It is difficult to immediately start an examination.

For the reason that the above-mentioned problems exist, the most of the former medical image diagnostic device is automatically ready to start an examination on the operation manual after a power supply of medical image diagnostic device was turned on. In this case, anyone can touch the operation terminal and information such as patient's individual information can be read with such the known medical image diagnostic device. Therefore, the former medical image diagnostic device has a security risk for leakage of the information.

SUMMARY OF THE INVENTION

Accordingly, the present invention has taken into consideration the above-described problems, and it is the first object of the present invention to provide a security management system and a method for managing security which a security management such as a login and logout to a operation terminal and a release of a lock corresponding to an authority of a user and a user group is complemented.

In addition, it is the second object of the present invention to provide a security management system and a method for managing security which a security management such as a login and logout to a operation terminal and a release of a lock corresponding to an authority of a user and a user group is complemented, and a user doesn't go through the regular process, and he uses limited functions of the operation terminal when it is exceptional.

In addition, it is the third object of the present invention to provide a security management system, a medical device and a method for managing security which it reduces a hindrance to a work such as a diagnosis and an examination in the medical field by making a security management such as a login and logout to a operation terminal and a release of a lock corresponding to an authority of a user and a user group, while meeting the request peculiar to medical field.

To solve the above-described problems, the present invention provides a security management system, comprising: an authentication unit for authenticating an operator of the operating terminal on the basis of operator information to identify the operator in order to determine whether the operator is permitted to login or release a lock; a current operator information inquiry unit for inquiring about login status information indicating whether the operating terminal is in a login status and current operator information regarding a current logined operator; an authority information inquiry unit for inquiring about authority information regarding the operator and that regarding the current operator on the basis of the operator information and the current operator information; a lock unit for detecting an event, where a predetermined lock condition is satisfied, in the login status to allow the operating terminal to change to a lock status, and for allowing the operating terminal to change to an operable status in response to a login instruction or an instruction for a release; and a lock control unit for acquiring the operator information and receiving an inquiry for the login status information and the current operator information from the current operator information inquiry unit, wherein when the operating terminal is in a logout status, the lock control unit supplies the operator information to the authentication unit to obtain authentication result information regarding the operator, and transmits the login instruction to the lock unit so long as authentication succeeds, and when the operating terminal is in the login status and is also in the lock status, the lock control unit supplies the operator information and the current operator information to the authority information inquiry unit to obtain the authority information regarding the operator and that regarding the current operator, supplies the operator information to the authentication unit to obtain authentication result information regarding the operator, compares the authority information with the other authority information, and transmits the instruction for a release to the lock unit so long as authentication of the operator succeeds and a predetermined condition is satisfied in the relation in authority information between the operator and the current operator.

To solve the above-described problems, the present invention provides a security management system, comprising: an authentication unit for authenticating an operator of the operating terminal on the basis of operator information to identify the operator in order to determine whether the operator is permitted to release a lock; a lock unit for detecting an event, where a predetermined lock condition is satisfied, when the operating terminal is in a login status to allow the operating terminal to change to a lock status, and for allowing the operating terminal to change to an operable status in response to an instruction for a release; a logout execution unit for allowing the operating terminal to change to a logout status in response to a logout instruction; a logout instruction unit for acquiring the logout instruction from the input device; and a lock control unit, wherein when receiving the operator information in the lock status, the lock control unit supplies the received operator information to the authentication unit to obtain authentication result information regarding the operator and transmits the instruction for a release to the lock unit so long as authentication succeeds, and when receiving the logout instruction from the logout instruction unit, the lock control unit transmits the received logout instruction to the logout execution unit.

To solve the above-described problems, the present invention provides a security management system, comprising: an authentication unit for authenticating an operator of the operating terminal on the basis of operator information to identify the operator in order to determine whether the operator is permitted to log in or release a lock; a lock unit for detecting an event, where a predetermined lock condition is satisfied, when the operating terminal is in a login status to allow the operating terminal to change to a lock status, and for allowing the operating terminal to change to an operable status in response to a login instruction or an instruction for a release; an emergency operator identification unit for acquiring emergency operator information, indicating that the operator is an emergency operator, from the input device; and a lock control unit, wherein when receiving the operator information, the lock control unit supplies the received operator information to the authentication unit to obtain authentication result information regarding the operator and transmits the login instruction or the instruction for a release to the lock unit so long as authentication succeeds, and when receiving the emergency operator information from the emergency operator identification unit, the lock control unit transmits the login instruction or the instruction for a release to the lock unit.

To solve the above-described problems, the present invention provides a security management system, comprising: an emergency operator identification unit for acquiring emergency operator information, indicating that an operator is an emergency operator, from the input device; a lock unit for allowing the operating terminal to change to a lock status when a predetermined lock condition is satisfied, and for allowing the operating terminal to change to a status permitted part of operation in response to an instruction for a release; and a lock control unit for transmitting the instruction for a release to release a part of the lock status to the lock unit when receiving the emergency operator information from the emergency operator identification unit.

To solve the above-described problems, the present invention provides a security management system, comprising: an emergency operator identification unit for acquiring emergency operator information, indicating that an operator is an emergency operator, from the input device; a lock unit for detecting an event, where a predetermined lock condition is satisfied, in a login status to allow the operating terminal to change to a lock status, and for allowing the operating terminal to change to an operable status or a status permitted part of operation in response to an instruction for a release; and a lock control unit, wherein when the operating terminal is in the login status and is also in the lock status and a predetermined lock condition is also satisfied, the lock control unit transmits the instruction for a release to release all of the lock status to the lock unit, and when receiving the emergency operator information from the emergency operator identification unit, the lock control unit transmits the instruction for a release to release part of the lock status to the lock unit.

To solve the above-described problems, the present invention provides a medical device, comprising: an emergency operator identification unit for acquiring emergency operator information, indicating that an operator is an emergency operator, from the input device; a screen lock unit for allowing the medical device to change to a screen lock status when a predetermined screen lock condition is satisfied, and for allowing the medical device to change to a status permitted part of operation in response to an instruction for a release; and a screen lock control unit for transmitting the instruction for a release to release a part of the screen lock status to the screen lock unit when receiving the emergency operator information from the emergency operator identification unit.

To solve the above-described problems, the present invention provides a medical device, comprising: an emergency operator identification unit for acquiring emergency operator information, indicating that an operator is an emergency operator, from the input device; a screen lock unit for detecting an event, where a predetermined screen lock condition is satisfied, in a login status to allow the medical device to change to a screen lock status, and for allowing the medical device to change to an operable status or a status permitted part of operation in response to an instruction for a release; and a screen lock control unit, wherein when the medical device is in the login status and is also in the screen lock status and a predetermined screen lock condition is also satisfied, the screen lock control unit transmits the instruction for a release to release all of the screen lock status to the screen lock unit, and when receiving the emergency operator information from the emergency operator identification unit, the screen lock control unit transmits the instruction for a release to release part of the screen lock status to the screen lock unit.

To solve the above-described problems, the present invention provides a medical device, comprising: an authentication unit for authenticating an operator of the operating terminal on the basis of operator information to identify the operator in order to determine whether the operator is permitted to log in or release a screen lock; a current operator information inquiry unit for inquiring for login status information indicating whether the medical device is in a login status and current operator information regarding a current logined operator; an authority information inquiry unit for inquiring for authority information regarding the operator and that regarding the current operator on the basis of the operator information and the current operator information; a screen lock unit for detecting an event, where a predetermined screen lock condition is satisfied, in the login status to allow the medical device to change to a screen lock status and for allowing the medical device to change to an operable status in response to a login instruction or an instruction for a release; and a screen lock control unit for acquiring the operator information and receiving an inquiry for the login status information and the current operator information from the current operator information inquiry unit, wherein when the medical device is in a logout status, the screen lock control unit supplies the operator information to the authentication unit to obtain authentication result information regarding the operator, and transmits the login instruction to the screen lock unit so long as authentication succeeds, and when the medical device is in the login status and is also in the screen lock status, the screen lock control unit supplies the operator information and the current operator information to the authority information inquiry unit to obtain the authority information regarding the operator and that regarding the current operator, supplies the operator information to the authentication unit to obtain authentication result information regarding the operator, compares the authority information with the other authority information and transmits the instruction for a release to the screen lock unit so long as authentication of the operator succeeds and a predetermined condition is satisfied in the relation in authority information between the operator and the current operator.

To solve the above-described problems, the present invention provides a medical device, comprising: an authentication unit for authenticating an operator of the operating terminal on the basis of operator information to identify the operator in order to determine whether the operator is permitted to release a screen lock; a screen lock unit for detecting an event, where a predetermined screen lock condition is satisfied, when the medical device is in a login status to allow the medical device to change to a screen lock status and for allowing the medical device to change to an operable status in response to an instruction for a release; a logout execution unit for allowing the medical device to change to a logout status in response to a logout instruction; a logout instruction unit for acquiring the logout instruction from the input device; and a screen lock control unit, wherein when receiving the operator information in the screen lock status, the screen lock control unit supplies the received operator information to the authentication unit to obtain authentication result information regarding the operator and transmits the instruction for a release to the screen lock unit so long as authentication succeeds, and when receiving the logout instruction from the logout instruction unit, the screen lock control unit transmits the received logout instruction to the logout execution unit.

To solve the above-described problems, the present invention provides a medical device, comprising: an authentication unit for authenticating an operator of the operating terminal on the basis of operator information to identify the operator in order to determine whether the operator is permitted to log in or release a screen lock; a screen lock unit for detecting an event, where a predetermined screen lock condition is satisfied, when the medical device is in a login status to allow the medical device to change to a screen lock status and for allowing the medical device to change to an operable status in response to a login instruction or an instruction for a release; an emergency operator identification unit for acquiring emergency operator information, indicating that the operator is an emergency operator, from the input device; and a screen lock control unit, wherein when receiving the operator information, the screen lock control unit supplies the received operator information to the authentication unit to obtain authentication result information regarding the operator and transmits the login instruction or the instruction for a release to the screen lock unit so long as authentication succeeds, and when receiving the emergency operator information from the emergency operator identification unit, the screen lock control unit transmits the login instruction or the instruction for a release to the screen lock unit To solve the above-described problems, the present invention provides a method for managing security, comprising the steps of: acquiring operator information to identify an operator of the operating terminal; authenticating the operator on the basis of the operator information in order to determine whether the operator is permitted to log in when the medical device is in a logout status; allowing the medical device to change to an operable status as long as authentication succeeds; comparing authority information regarding the operator with that regarding a current logined operator when the medical device is in a screen lock status; authenticating the operator on the basis of the operator information in order to determine whether the operator is permitted to release a screen lock so long as a predetermined condition is satisfied in the relation in authority information between the operator and the current operator; and allowing the medical device to change to the operable status so long as authentication succeeds.

To solve the above-described problems, the present invention provides a method for managing security, comprising the steps of: authenticating an operator of the operating terminal on the basis of operator information to identify the operator in order to determine whether the operator is permitted to release a screen lock when the operator information is supplied to the input device while the medical device is in a screen lock status; allowing the medical device to change to an operable status as long as authentication succeeds; and allowing the medical device to change to a logout status when a logout instruction is supplied to the input device.

To solve the above-described problems, the present invention provides a method for managing security, comprising the steps of: authenticating an operator of the operating terminal on the basis of operator information to identify the operator in order to determine whether the operator is permitted to release a screen lock or log in when the input device receives the operator information while the medical device is in a screen lock status or a logout status; allowing the medical device to change to an operable status as long as authentication succeeds; and allowing the medical device to change to the operable status when the input device receives emergency operator information indicating that the operator is an emergency operator.

Therefore, according to the present invention to provide a security management system and a method for managing security, a security management such as a login and logout to a operation terminal and a release of a lock corresponding to a login authority of a user and a user group can be complemented.

In addition, according to the present invention to provide a security management system and a method for managing security, a security management such as a login and logout to a operation terminal and a release of a lock corresponding to a login authority of a user and a user group can be complemented, and a user doesn't go through the regular process, and he can use a part function of the operation terminal when it is exceptional.

In addition, according to the present invention to provide a security management system a medical device and a method for managing security, it is possible that it reduces a hindrance to a work such as a diagnosis and an examination in the medical field by making a security management such as a login and logout to a operation terminal and a release of a lock corresponding to a login authority of a user and a user group, while meeting the request peculiar to medical field.

DESCRIPTION OF THE PREFERRED EMBODIMENTS

A security management system, a medical device and a method for managing security according to embodiments of the present invention will be described with reference to the accompanying drawings.

And the security management system according to embodiments of the present invention is installed on a general-purpose computer. The case that the security management system is installed on an operating terminal that is a computer is explained as an example by the following explanation. The computer composes a part of a medical image diagnostic device that is the example of a medical device.

Figure 1:
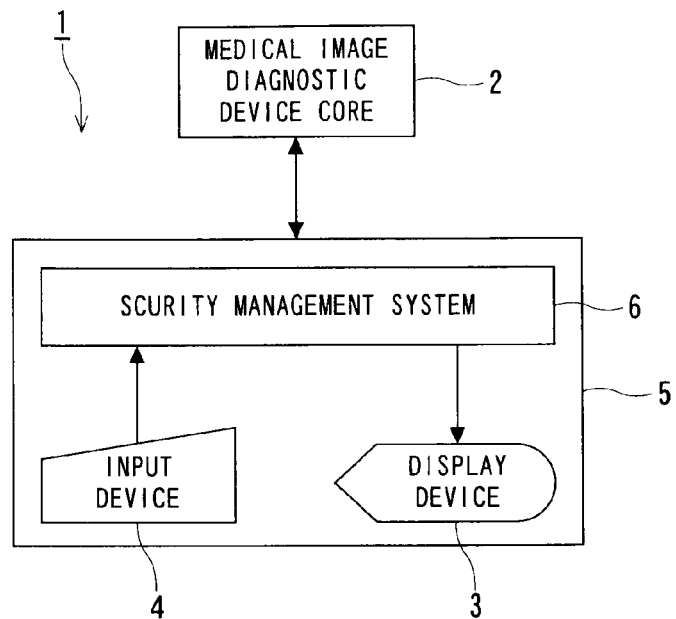
FIG. 1 is a functional block diagram of a security management system and a medical device according to a first embodiment of the present invention.

FIG. 1 is a functional block diagram of a security management system and a medical device according to a first embodiment of the present invention.

FIG. 1 shows a medical image diagnostic device 1, serving as an example of the medical device according to the first embodiment. The medical image diagnostic device 1 includes a medical image diagnostic device core 2 and an operating terminal 5 having a display device 3 and an input device 4. A security management system 6 is installed on the operating terminal 5. Alternatively, the security management system 6 may be installed on the medical image diagnostic device core 2 or be provided as an external independent system. The medical image diagnostic device 1 may include at least one arbitrary device, e.g., a magnetic resonance imaging (MRI) machine, an X-ray computed tomography (CT) scanner, an ultrasonic diagnostic device, a positron emission computed tomography (PET) machine, and an X-ray diagnostic device. The security management system 6 may also be installed on another medical device including an arbitrary medical system, such as a hospital information system (HIS), in addition to the medical image diagnostic device 1. The security management system 6 can be installed on an arbitrary medical device. It is unnecessary to clearly separate the security management system 6 from another system. The security management system 6 may be independently provided without being installed on a medical device.

FIG. 1 shows an essential part of the medical image diagnostic device 1, the part being related to the minimum structure and operation of the security management system 6. Components for performing other processes, e.g., acquiring data, imaging acquired data, and clinical application and measurement are not shown and a description of those components and the operations thereof is omitted.

The medical image diagnostic device 1 is operated on the basis of information received from the input device 4 of the operating terminal 5. According to information processing through the security management system 6, the medical image diagnostic device 1 can change between a system stop status, an operable status, a screen lock status, and a logout status.

Figure 2:
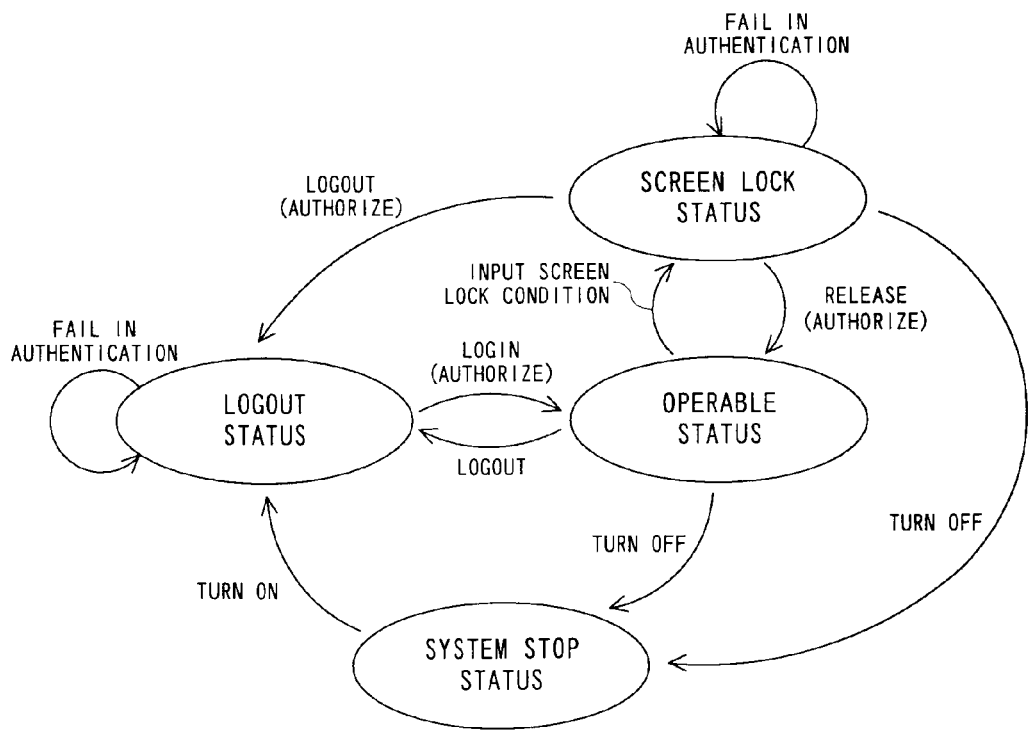
FIG. 2 is a diagram of the status transition of the medical image diagnostic device in FIG. 1.

FIG. 2 is a diagram of the status transition of the medical image diagnostic device 1 in FIG. 1.

Referring to FIG. 2, when the medical image diagnostic device 1 is turned on by an input by the operating terminal 5, the medical image diagnostic device 1 changes from the system stop status to the logout status. In the logout status, the security management system 6 transmits login screen information to the display device 3 of the operating terminal 5. Then, the display device 3 displays a login screen.

In the logout status, when the input device 4 supplies login instruction and operator information, e.g., the identical code (ID) and password of a user (operator), to the operating terminal 5, the security management system 6 authenticates the user. If authentication succeeds, the medical image diagnostic device 1 changes from the logout status to the operable status. If the authentication fails, the medical image diagnostic device 1 maintains the logout status. On the other hand, in the operable status, when receiving a logout instruction from the input device 4, the medical image diagnostic device 1 changes from the operable status to the logout status.

When the security management system 6 detects an event where a predetermined lock condition is satisfied, e.g., where there is no key input or a mouse is not operated in the input device 4 for predetermined time, or where a predetermined operation is performed through the input device 4, the security management system 6 changes from the operable status to the lock status. As for the present invention, a predetermined screen lock condition is used as the example of the predetermined lock condition, and a screen lock status is explained as an example of the lock status. Accordingly, when the security management system 6 detects an event where the predetermined screen lock condition is satisfied, the security management system 6 activates a screen saver and allows the display device 3 to display a screen saver screen and a screen to release screen lock to release a screen lock. Consequently, the medical image diagnostic device 1 changes from the operable status to the screen lock status. The case that the medical image diagnostic device 1 changes from the operable status to the screen lock status is explained as an example in the following.

Further, in the screen lock status, when the input device 4 supplies an instruction for release and operator information, e.g., the ID and password of an operator, to the operating terminal 5, the security management system 6 authenticates the operator. If authentication succeeds, the medical image diagnostic device 1 changes from the screen lock status to the operable status. If the authentication fails, the medical image diagnostic device 1 maintains the screen lock status. In the screen lock status, when the input device 4 supplies logout instruction and operator information, such as the ID and password of an operator, to the operating terminal 5, the security management system 6 authenticates the operator. If authentication succeeds, the medical image diagnostic device 1 changes from the screen lock status to the logout status. If the authentication fails, the medical image diagnostic device 1 keeps the screen lock status.

In addition, in the screen lock status or the operable status, when operating by the operation terminal 5 turned off the medical image diagnostic device 1, the medical image diagnostic device 1 changes from the screen lock status or the operable status to the system stop status.

The functional structure of the security management system 6 will now be described in detail below.

Figure 3:
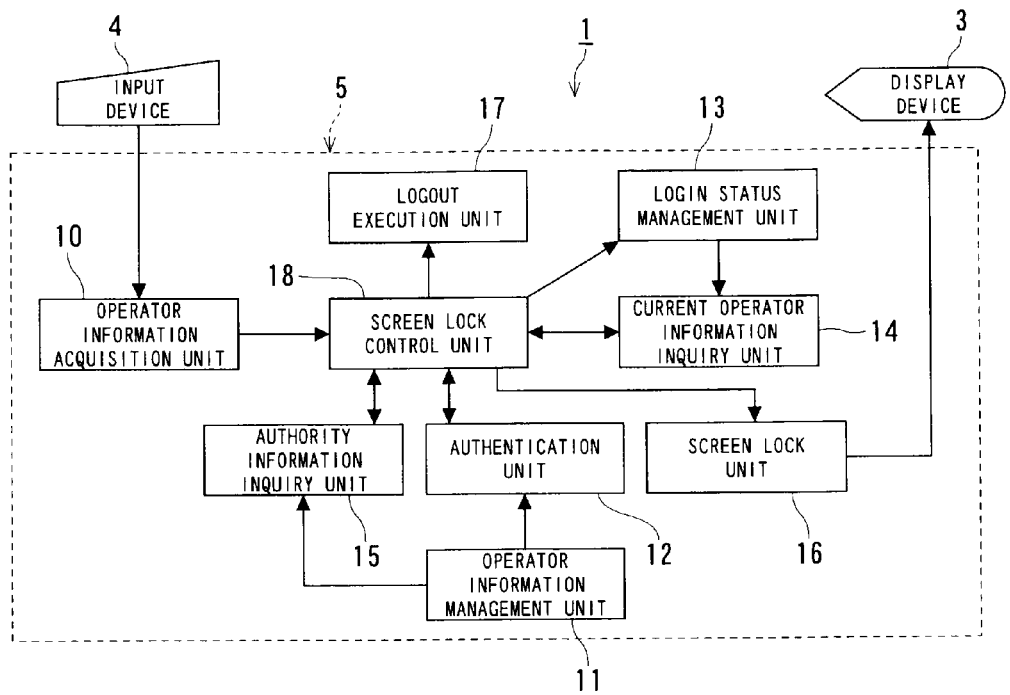
FIG. 3 is a block diagram of the detailed functional structure of the security management system in FIG. 1.

FIG. 3 is a block diagram of the detailed functional structure of the security management system 6 in FIG. 1.

The security management system 6 manages the security of the medical image diagnostic device 1 according to a security managing method according to the present invention. The security management system 6 includes an operator information acquisition unit 10, an operator information management unit 11, an authentication unit 12, a login status management unit 13, a current operator information inquiry unit 14, an authority information inquiry unit 15, a screen lock unit (a lock unit) 16, a logout execution unit 17, and a screen lock control unit (a lock control unit) 18.

The respective components of the security management system 6, i.e., the operator information acquisition unit 10, the operator information management unit 11, the authentication unit 12, the login status management unit 13, the current operator information inquiry unit 14, the authority information inquiry unit 15, the screen lock unit 16, the logout execution unit 17, and the screen lock control unit 18 can be constructed by allowing a computer to read a security managing program. A part or the whole of the components of the security management system 6 may be constructed using circuitry.

The operator information acquisition unit 10 has a function of acquiring operator information, e.g., the ID and password of an operator, in addition to or serving as a login instruction or an instruction for a release from the input device 4 and supplying the acquired information to the screen lock control unit 18.

The operator information management unit 11 has a function of relating authority information describing arbitrary authority, e.g., authority to login, authority to release a screen lock, authority to use an application, authority to access specific data, authority to write data, and/or authority to rewrite data, to the operator information and storing the related information and storing the related information as authentication information. The authentication information includes attribute information regarding the role of an operator or a group that the operator belongs to as necessary such that the attribute information is related to the corresponding operator information and authority information.

The authentication unit 12 has a function of authenticating an operator to permit the operator to log in or release the screen lock in response to operator information from the screen lock control unit 18 and sending authentication result information indicating whether authentication succeeds or fails to the screen lock control unit 18. In addition, upon authenticating, the authentication unit 12 authenticates an operator with reference to the corresponding authentication information stored in the operator information management unit 11.

The login status management unit 13 has a function of storing login status information indicating whether the medical image diagnostic device 1 is in a login status, i.e., whether the medical image diagnostic device 1 is in the screen lock status or the operable status and further storing operator information regarding a logined operator as long as the device 1 is in the login status.

The current operator information inquiry unit 14 has a function of referring to the login status management unit 13 in response to a request to inquire for login status information and operator information regarding a current logined (logged-in) operator (current operator) received from the screen lock control unit 18 to provide the login status information and the operator information to the screen lock control unit 18.

The authority information inquiry unit 15 has a function of receiving operator information regarding a current logined operator and a new operator, which is acquired with an instruction for a release through the operator information acquisition unit 10, from the screen lock control unit 18 when the medical image diagnostic device 1 is in the login status, i.e., the screen lock status or the operable status, and providing authority information related to each piece of the operator information to the screen lock control unit 18. At that time, the authority information inquiry unit 15 can obtain the authority information concerning each operator by reading this information from the operator information management unit 11.

The screen lock unit 16 has a function of, when detecting an event where the predetermined screen lock condition is satisfied, activating the screen saver and displaying the screen saver screen and the screen to release screen lock on the display device 3 to allow the medical image diagnostic device 1 to change from the operable status to the screen lock status. In addition, the unit 16 has a function of, when receiving an instruction for a release from the screen lock control unit 18, releasing the screen lock to allow the medical image diagnostic device 1 to change from the screen lock status to the operable status.

Further, the screen lock unit 16 has a function of supplying login screen information to the display device 3 of the operating terminal 5 to display the login screen on the display device 3 when the medical image diagnostic device 1 is in the logout status and a function of, when receiving a login instruction from the screen lock control unit 18, allowing the medical image diagnostic device 1 to change from the logout status to the operable status.

The logout execution unit 17 has a function of, when receiving a logout instruction from the screen lock control unit 18, allowing the medical image diagnostic device 1 to change from the screen lock status or the operable status to the logout status. In other words, the logout execution unit 17 allows the medical image diagnostic device 1 to change to the logout status, thus terminating the use of the system.

The screen lock control unit 18 has a function of receiving operator information in addition to a login instruction or an instruction for a release from the operator information acquisition unit 10 and also receiving a logout instruction from the input device 4 to monitor the operation in the input device 4 through an operator, and when a predetermined condition regarding, e.g., the type of status, is satisfied, transmitting and receiving necessary information to/from the authentication unit 12, the current operator information inquiry unit 14, the authority information inquiry unit 15, the screen lock unit 16, and the logout execution unit 17 to control the operating screen.

Specifically, the screen lock control unit 18 has a function of supplying operator information received from the operator information acquisition unit 10 to the authentication unit 12 to request the transmission of authentication result information and receiving the authentication result information from the authentication unit 12 and a function of requesting the current operator information inquiry unit 14 to inquire for login status information and operator information regarding a current logined operator and obtaining the login status information and the operator information from the current operator information inquiry unit 14. In addition, the screen lock control unit 18 has a function of supplying an instruction for a release or a login instruction to the screen lock unit 16.

In addition, the screen lock control unit 18 has a function of supplying operator information of a current logined operator and a new operator that is transmitted from the operator information acquisition unit 10 with/as the screen lock release instruction, and a function of obtaining authority information related to each piece of the operator information from the authority information inquiry unit 15, when the medical image diagnostic device 1 is in the login status. The screen lock control unit 18 also has a function of supplying an instruction for a release to the screen lock unit 16 or transmitting a logout instruction to the logout execution unit 17 when the relation between the authority information regarding the current operator and that regarding the other operator satisfies a predetermined condition.

Further, when transmitting a login instruction or an instruction for a release to the logout execution unit 17, alternatively, when supplying a logout instruction to the logout execution unit 17, the screen lock control unit 18 writes information regarding the transmission and operator information regarding an operator to be a logined operator in the login status management unit 13, thus updating login status information and operator information stored in the login status management unit 13.

The operation of the medical image diagnostic device 1 will now be described below.

Figure 4:
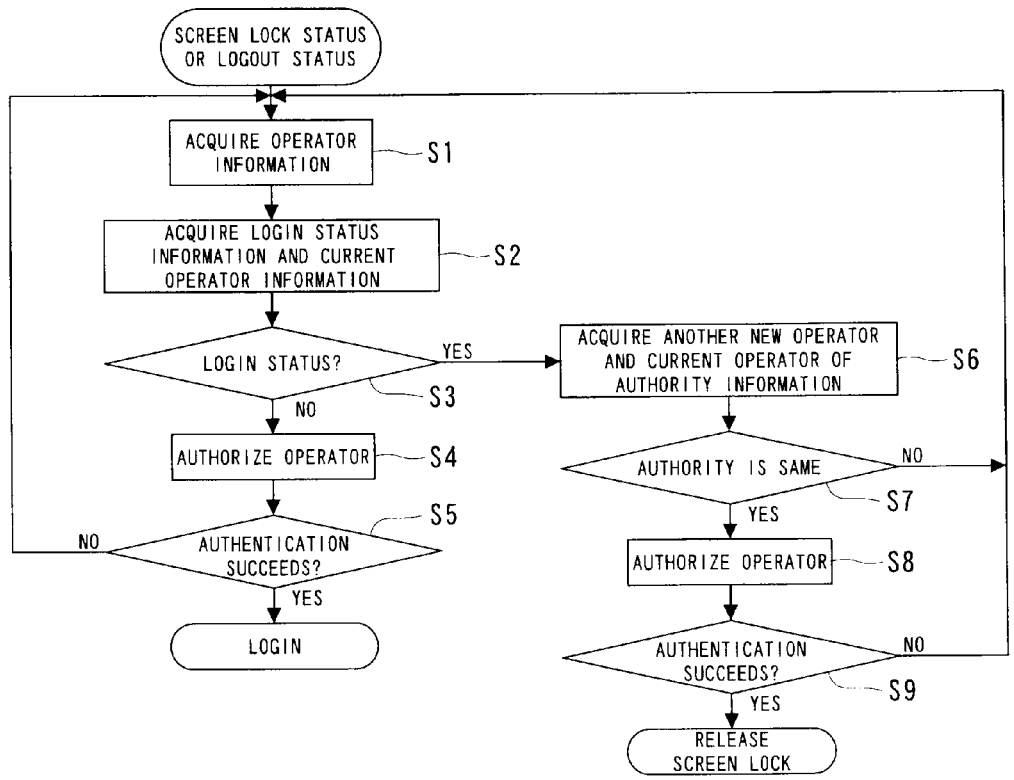
FIG. 4 is a flowchart of a process of controlling the status of the medical image diagnostic device through the security management system of the medical image diagnostic device in FIG. 1 and switching the operating screen displayed on the display device between a locked mode and a released mode to manage the security of the medical image diagnostic device.

FIG. 4 is a flowchart of a process of controlling the status of the medical image diagnostic device 1 through the security management system 6 of the medical image diagnostic device 1 in FIG. 1 and switching the operating screen displayed on the display device 3 between a locked mode and a released mode to manage the security of the medical image diagnostic device 1. In FIG. 4, each reference numeral with a character "S" denotes a step of the flowchart.

In the medical image diagnostic device 1, when detecting an event where the predetermined screen lock condition is satisfied, the screen lock unit 16 activates the screen saver and allows the display device 3 to display the screen saver screen and the screen to release screen lock. The medical image diagnostic device 1 changes from the operable status to the screen lock status. After the medical image diagnostic device 1 is turned on, alternatively, when any operator logs out the device 1, the device 1 changes to the logout status.

In the screen lock status or the logout status, to permit an operator to release the screen lock or log in such that the medical image diagnostic device 1 changes to the operable status, operator information, e.g., the ID and password of the operator, and an instruction for a release or a login instruction are supplied from the input device 4. And, it isn't limited in that case by this invention though the case that the operator is authorized by inputting the operator information like the ID and password from the input device 4 is explained. For example, the medical image diagnostic device 1 may be constructed so that the operator may be authorized by the general method of a card, a fingerprint, an iris, a voiceprint and others.

In step S1, the operator information acquisition unit 10 acquires the operator information regarding the operator as the login instruction or the instruction for a release from the input device 4 and transmits the acquired information to the screen lock control unit 18.

In step S2, the screen lock control unit 18 requests the current operator information inquiry unit 14 to inquire for login status information and operator information regarding a current logined operator. The current operator information inquiry unit 14 refers to the login status management unit 13 for the login status information and the operator information regarding the current logined operator and then obtains those pieces of information serving as current operator information. The current operator information inquiry unit 14 provides the acquired current operator information to the screen lock control unit 18.

In step S3, the screen lock control unit 18 determines whether the medical image diagnostic device 1 is in the login status with reference to the login status information included in the current operator information.

When determining that the device 1 is not in the login status, in step S4, the screen lock control unit 18 interprets the operator information supplied from the operator information acquisition unit 10 as the login instruction and then transmits the operator information to the authentication unit 12 to request the transmission of authentication result information. The authentication unit 12 determines whether the operator is authorized to log in with reference to the corresponding authentication information stored in the operator information management unit 11, thus authenticating the operator. After that, the authentication unit 12 transmits authentication result information indicating whether authentication succeeds or fails to the screen lock control unit 18.

In step S5, the screen lock control unit 18 determines whether the authentication succeeds or fails with reference to the authentication result information received from the authentication unit 12. If the authentication fails, the screen lock control unit 18 does not perform processing. In other words, the operator is not permitted to log in. Consequently, the medical image diagnostic device 1 maintains the logout status.

On the other hand, if the authentication succeeds, the screen lock control unit 18 transmits the login instruction to the screen lock unit 16. Consequently, the screen lock unit 16 permits the operator to login to the medical image diagnostic device 1 and also allows the medical image diagnostic device 1 to change from the logout status to the operable status. Thus, the operator can start the use of the system.

When determining in step 3 that the device 1 is in the login status, the screen lock control unit 18 interprets the operator information received from the operator information acquisition unit 10 as the instruction for a release. In other words, it can be assumed that the screen is locked because another operator (current operator) is logging in.

In step S6, the screen lock control unit 18 transmits the operator information regarding the current logined operator (current operator) and the operator information regarding another new operator acquired as the instruction for a release through the operator information acquisition unit 10 to the authority information inquiry unit 15, thus requesting the transmission of authority information for each operator. The authority information inquiry unit 15 reads the authority information for each operator from the operator information management unit 11 on the basis of the pieces of operator information received from the screen lock control unit 18, thus obtaining the authority information for each operator. Then, the authority information inquiry unit 15 transmits the obtained pieces of authority information to the screen lock control unit 18.

In step S7, the screen lock control unit 18 compares the authority information regarding the current operator with that regarding the other new operator who instructs to release the screen lock, thus determining whether a predetermined condition is satisfied. The matter that both of the authority information of the operator who transmits instruction for releasing of the current operator are the same is made a fixed condition is explained as an example by this invention. The screen lock control unit 18 determines whether one of the authority information is identical to the other one. In this instance, if a part of the authority information is the same as that of the other one, alternatively, when there is a predetermined relation between the authority information and the other authority information, so long as each authority information includes the authority to release the screen lock, the authority information can be substantially regarded as the same as the other one.

When determining that the authority information regarding the current operator and that regarding the other operator each include no description that the corresponding operator is authorized to release the screen lock and the authority information is not substantially the same as the other one, the screen lock control unit 18 does not perform processing. Consequently, the medical image diagnostic device 1 maintains the screen lock status.

On the contrary, when determining that the authority information regarding the current operator and that regarding the other operator each include the authority to release the screen lock and the authority information is substantially the same as the other one, in step S8, the screen lock control unit 18 supplies the operator information regarding the other new operator to the authentication unit 12 in the same way as in step S4 to request the transmission of authentication result information and acquire the authentication result information from the unit 12.

In step S9, the screen lock control unit 18 determines whether authentication succeeds or fails in the same way as in step S5. If the authentication fails, the screen lock control unit 18 does not perform processing. Thus, the medical image diagnostic device 1 keeps the screen lock status.

On the other hand, if the authentication succeeds, the screen lock control unit 18 transmits the instruction for a release to the screen lock unit 16. Therefore, the screen lock unit 16 permits the other new operator to release the screen lock and allows the medical image diagnostic device 1 to change from the screen lock status to the operable status. Consequently, the operator can start operating the use of the system.

To allow the medical image diagnostic device 1 to change from the screen lock status to the logout status, the authority information regarding the current operator is compared to that regarding another new operator who inputs a logout instruction in the same way as the case where to release the screen lock. If the authority information is substantially the same as the other one, the other new operator can log out. In this case, the screen lock control unit 18 transmits the logout instruction to the logout execution unit 17. The logout execution unit 17 allows the medical image diagnostic device 1 to change from the screen lock status to the logout status.

As mentioned above, in the medical image diagnostic device 1 according to the present embodiment, even when the operating screen is locked, the screen lock can be released by the operator having the same or partially the same authorities as those of the logined operator.

General medical image diagnostic devices have to be in a status where a medical examination is practicable at any time. In many cases, a logined operator is a technician. The technician releases a screen lock and performs an examination. According to the medical image diagnostic device 1 constructed such that a screen lock can be released by a specified operator having the same or partially the same authorities as those of a logined operator, anybody who is a technician ca release the screen lock and perform a medical examination. Thus, the medical image diagnostic device 1 according to the present embodiment can ensure security management that responds to demands specific to medical services.

Figure 5:
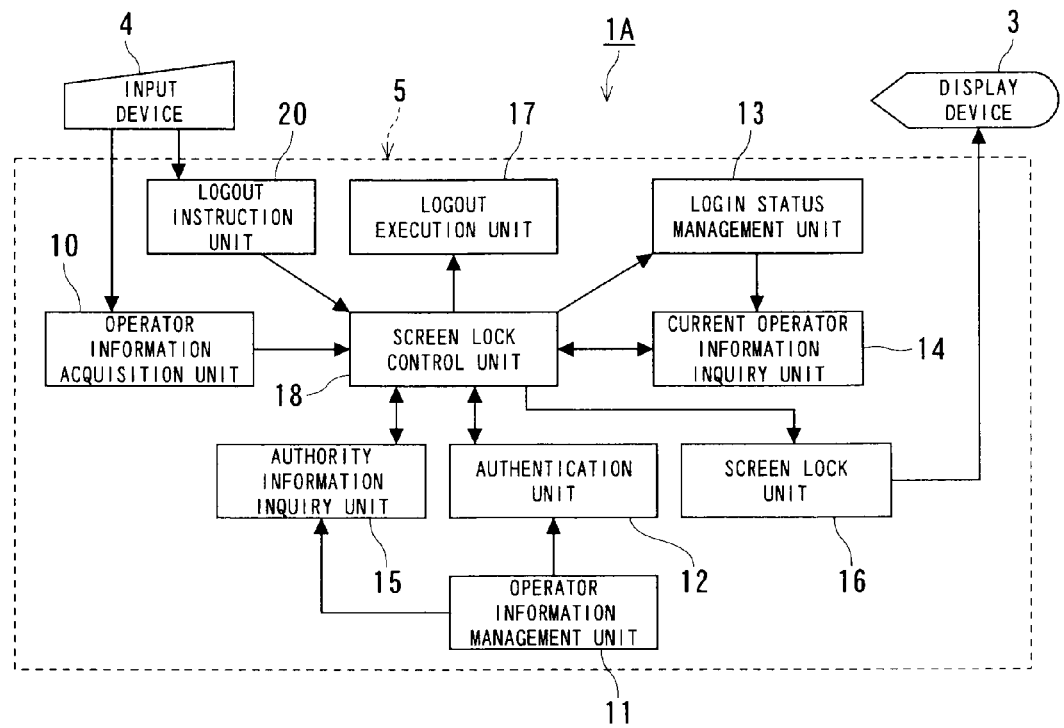
FIG. 5 is a functional block diagram of a security management system and a medical device according to a second embodiment of the present invention.

FIG. 5 is a functional block diagram of a security management system and a medical device according to a second embodiment of the present invention.

Referring to FIG. 5, a medical image diagnostic device 1A, serving as an example of the medical device, differs from the medical image diagnostic device 1 shown in FIG. 1 with respect to the following points: A security management system 6 includes a logout instruction unit 20. A screen lock control unit 18 includes another function. Since the other structure and operation are substantially the same as those of the medical image diagnostic device 1 in FIG. 1, only the functional block diagram of the security management system 6 is shown. The same components as those of the medical image diagnostic device 1 are designated by the same reference numerals and a description of the previously explained components is omitted.

In the medical image diagnostic device 1A, the security management system 6 includes the logout instruction unit 20. In a screen lock status, the logout instruction unit 20 acquires a logout instruction excluding operator information regarding an operator from an input device 4 and transmits the acquired logout instruction to the screen lock control unit 18.

The screen lock control unit 18 further includes another function in addition to the functions of the screen lock control unit 18 in the medical image diagnostic device 1 in FIG. 1. In other words, when receiving a logout instruction from the logout instruction unit 20, the screen lock control unit 18 transmits the logout instruction to a logout execution unit 17, thus allowing the medical image diagnostic device 1A to change from the screen lock status to a logout status.

Preferably, a screen lock unit 16 generates screen to release screen lock information so that a logout instruction can be entered on a screen to release screen lock in the input device 4 without including operator information regarding an operator.

Figure 6:
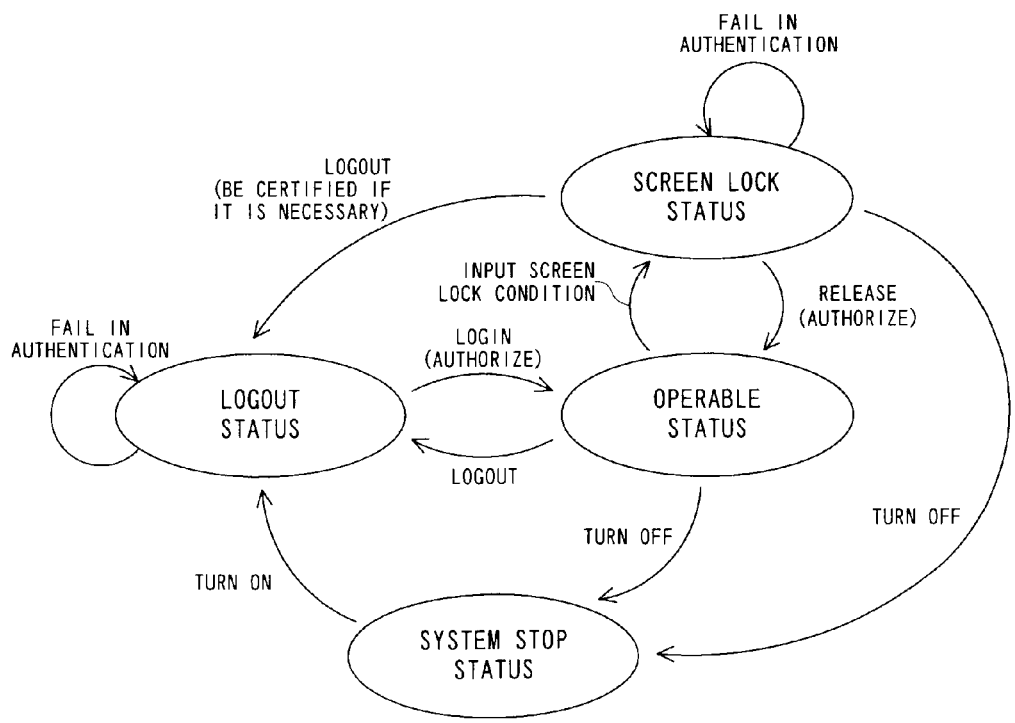
FIG. 6 is a status transition diagram of the medical image diagnostic device 1A in FIG. 5.

FIG. 6 is a status transition diagram of the medical image diagnostic device 1A in FIG. 5.

Referring to FIG. 6, the status transition of the medical image diagnostic device 1A differs from that of the medical image diagnostic device 1 in FIG. 2 with respect to the point that when the device 1A changes from the screen lock status to the logout status, an operator does not need to always be authenticated. A status relating to the logout instruction unit 20 does not include a system stop status. Only when an operating screen is locked while a certain operator is logging on, the logout instruction unit 20 performs predetermined processing.

The operation of the medical image diagnostic device 1A will now be described.

Figure 7:
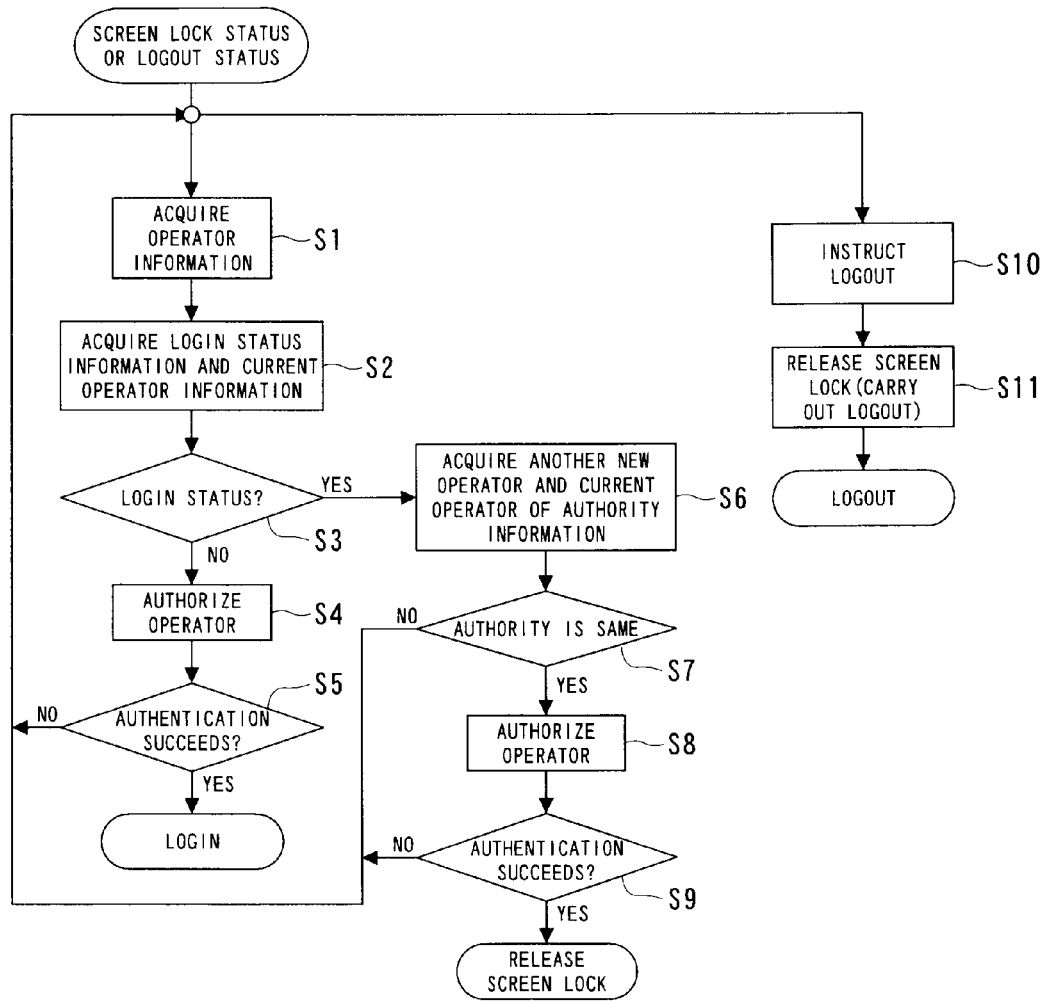
FIG. 7 is a flowchart of a process of controlling the status of the medical image diagnostic device through the security management system in the medical image diagnostic device in FIG. 5 and allowing the device to change from the screen lock status to the logout status.

FIG. 7 is a flowchart of a process of controlling the status of the medical image diagnostic device 1A through the security management system 6 in the medical image diagnostic device 1A in FIG. 5 and allowing the device 1A to change from the screen lock status to the logout status. In FIG. 7, each reference numeral with a character "S" denotes a step of the flowchart. The same steps as those in FIG. 4 are designated by the same reference numerals and a description of the previously explained steps is omitted.

In the medical image diagnostic device 1A, in the screen lock status, an operator can enter a logout instruction without including operator information regarding the operator through the input device 4.

Figure 8:
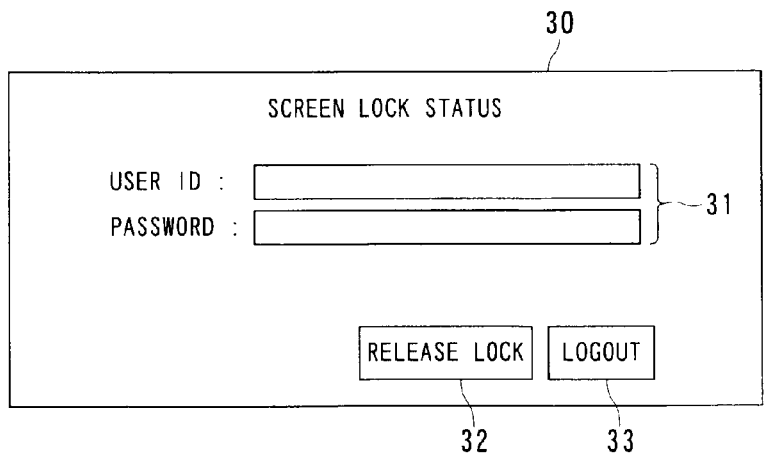
FIG. 8 shows an example of a screen to release screen lock to release a screen lock, the screen to release screen lock being displayed on a display device of the medical image diagnostic device in FIG. 5.

FIG. 8 shows an example of a screen to release screen lock to release a screen lock, the screen to release screen lock being displayed on a display device 3 of the medical image diagnostic device 1A in FIG. 5.

A screen lock unit 16 displays a screen to release screen lock 30 as shown in, e.g., FIG. 8, on the display device 3. The screen to release screen lock 30 includes an operator information entry field 31, where the user ID and password of an operator are entered, and a release button 32 to issue an instruction for a release. The screen to release screen lock 30 further includes a logout (Logout) button 33 to issue a logout instruction.

An operator can press the logout button 33 in the screen to release screen lock 30 without entering the user ID or password using the input device 4. Consequently, the input device 4 transmits a logout instruction to the security management system 6.

In step S10, the logout instruction unit 20 obtains the logout instruction excluding operator information regarding the operator from the input device 4 and transmits the obtained logout instruction to the screen lock control unit 18.

In step S11, the screen lock control unit 18 transmits the logout instruction received from the logout instruction unit 20 to the logout execution unit 17, thus allowing the medical image diagnostic device 1A to change from the screen lock status to the logout status. Consequently, the screen lock is released. After a process used by a current logined operator is finished, the medical image diagnostic device 1A enters the logout status.

If a new operator has the authority to log in, the operator logs out and, after that, the operator is authenticated in the usual way. If authentication succeeds, the operator can use the medical image diagnostic device 1A.

In other words, in the medical image diagnostic device 1A according to the present embodiment, during the screen lock status, anyone can serve as an operator and log out the device 1A irrespective of whether he or she has the authority to release the screen lock or log in.

As mentioned above, general medical image diagnostic devices have to be in a status where a medical examination is practicable at any time. Therefore, it is important to release a screen lock so that an examination is practicable even when an operating screen is locked. According to the medical image diagnostic device 1A, in addition to the same advantages as those of the medical image diagnostic device 1 shown in FIG. 1, even when the operating screen is locked, an operator except a current logined operator can log out in order to temporarily terminate the use of a system.

Figure 9:
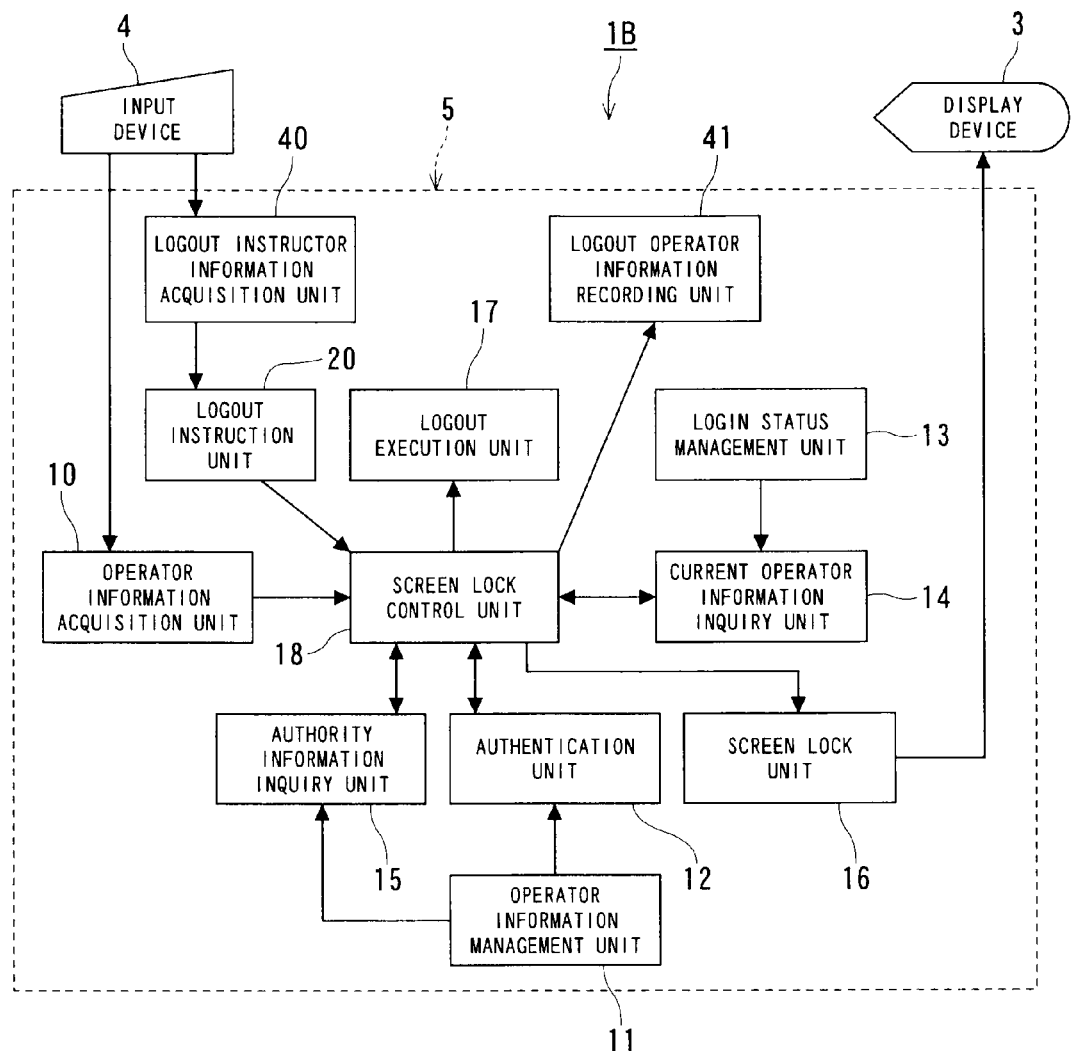
FIG. 9 is a functional block diagram of a security management system and a medical device according to a third embodiment of the present invention.

FIG. 9 is a functional block diagram of a security management system and a medical device according to a third embodiment of the present invention.

Referring to FIG. 9, a medical image diagnostic device 1B, serving as an example of the medical device, differs from the medical image diagnostic device 1A shown in FIG. 5 with respect to the following points: A security management system 6 includes a logout instructor information acquisition unit 40 and a logout operator information recording unit 41. A screen lock control unit 18 and a logout instruction unit 20 each have another function. Since the other structure and operation are substantially the same as those of the medical image diagnostic device 1A in FIG. 5, only the functional block diagram of the security management system 6 is shown. The same components as those of the medical image diagnostic device 1A are designated by the same reference numerals and a description of the previously explained components is omitted.

In other words, the security management system 6 in the medical image diagnostic device 1B includes the logout instructor information acquisition unit 40 and the logout operator information recording unit 41.

The logout instructor information acquisition unit 40 has a function of acquiring operator information regarding an operator who instructs to log out in a screen lock status, serving as logout instructor information, in addition to or as a logout instruction from an input device 4. The logout instructor information acquisition unit 40 has another function of transmitting the acquired logout instructor information or logout instruction to the logout instruction unit 20.

The logout instruction unit 20 transmits the logout instructor information received from the logout instructor information acquisition unit 40 in addition to or as the logout instruction to the screen lock control unit 18.

The screen lock control unit 18 further includes a function of transmitting the logout instructor information received from the logout instruction unit 20 to the authentication unit 12 to request the transmission of authentication result information indicating whether the logout instructor has the authority to log out and receiving the authentication result information from the authentication unit 12. In addition, the screen lock control unit 18 includes a function of writing the logout instructor information in the logout operator information recording unit 41 when it is determined that authentication with respect to the logout instructor succeeds and transmitting the logout instruction received from the logout instruction unit 20 to the logout execution unit 17 to allow the medical image diagnostic device 1B from the screen lock status to a logout status.

Consequently, the logout instructor information obtained from the logout instructor information acquisition unit 40 is recorded in the logout operator information recording unit 41. Arbitrary information, e.g., the date and time of logout, can be added to logout instructor information to be recorded in the logout operator information recording unit 41.

The operation of the medical image diagnostic device 1B will now be described.

Figure 10:
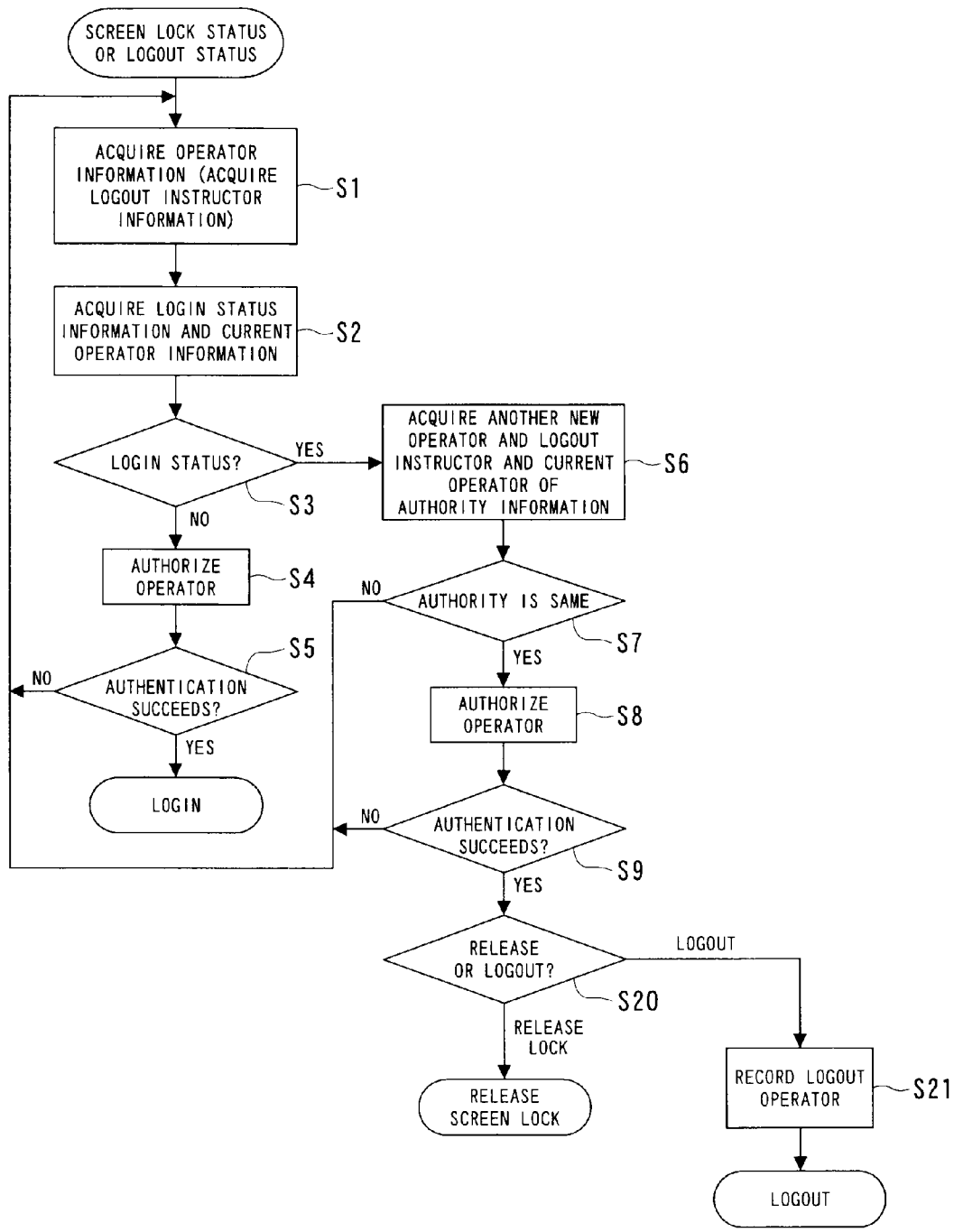
FIG. 10 is a flowchart of a process of controlling the status of the medical image diagnostic device through the security management system of the device in FIG. 9 and allowing the device to change from the screen lock status to the logout status.

FIG. 10 is a flowchart of a process of controlling the status of the medical image diagnostic device 1B through the security management system 6 of the device 1B in FIG. 9 and allowing the device 1B to change from the screen lock status to the logout status. In FIG. 10, each reference numeral with a character "S" denotes a step of the flowchart. The same steps as those in FIGS. 4 and 7 are designated by the same reference numerals and a description of the previously explained steps is omitted.

A logout instruction and an instruction for a release have different contents. In response to any of the above instructions, an operator can be authenticated in the same way. Accordingly, logout instructor information can be handled as the same as operator information regarding an operator who instructs to release a screen lock. A person who instructs to log out can be authenticated based on the corresponding logout instructor information in the same way as authentication based on operator information regarding an operator who instructs to release the screen lock.

As for logout instructor information, the logout instructor information acquisition unit 40 transmits the logout instructor information in addition to or as a logout instruction to the logout instruction unit 20, and the logout instruction unit 20 then transmits the information to the screen lock control unit 18.

For example, if a new operator except a current logined operator is a logout instructor, a user ID and a password can be previously assigned as logout instructor information to the logout instructor. A screen to release screen lock 30, which is the same as that in FIG. 8, is displayed on a display device 3 to prompt the logout instructor to enter the user ID and password. When a logout (Logout) button 33 is pressed to issue a logout instruction, the logout instructor information acquisition unit 40 can receive the logout instruction. In addition, the logout instructor can be authenticated on the basis of the user ID and password included in the logout instruction information.

If authentication with respect to the logout instructor or the operator, who instructs to release the screen lock, succeeds by the same processing steps (S1 to S9) as shown in FIG. 4, in step S20, the screen lock control unit 18 determines whether the instruction is a logout instruction or an instruction for a release. If it is an instruction for a release, the screen lock control unit 18 transmits the instruction for a release to the screen lock unit 16. Consequently, the screen lock unit 16 allows the medical image diagnostic device 1B to change from the screen lock status to an operable status.

On the other hand, if it is determined in step S20 that the instruction is a logout instruction, in step S21, the screen lock control unit 18 writes the logout instructor information in the logout operator information recording unit 41.

The screen lock control unit 18 transmits the logout instruction received from the logout instruction unit 20 to the logout execution unit 17, thus allowing the medical image diagnostic device 1B to change from the screen lock status to the logout status.

In other words, in the medical image diagnostic device 1B, an operator (logout instructor) who instructs to log out in the screen lock status is authenticated. If authentication succeeds, e.g., it is determined that the operator has the authority to log out, the operator except a current logined operator can log out.

In the foregoing medical image diagnostic device 1A shown in FIG. 5, anyone can log out in the screen lock status. In some cases, preferably, specific limited persons may be authorized to log out. According to the present embodiment, the medical image diagnostic device 1B is constructed such that an operator who instructs to log out can be authenticated. Consequently, in addition to the same advantages as those of the medical image diagnosis device 1A in FIG. 5, security management responding to demands specific to medical services with more reliability can be ensured.

In addition, since logout instructor information including identification information regarding a logout instructor can be recorded, the logout instructor who logged out can be confirmed later.

Figure 11:
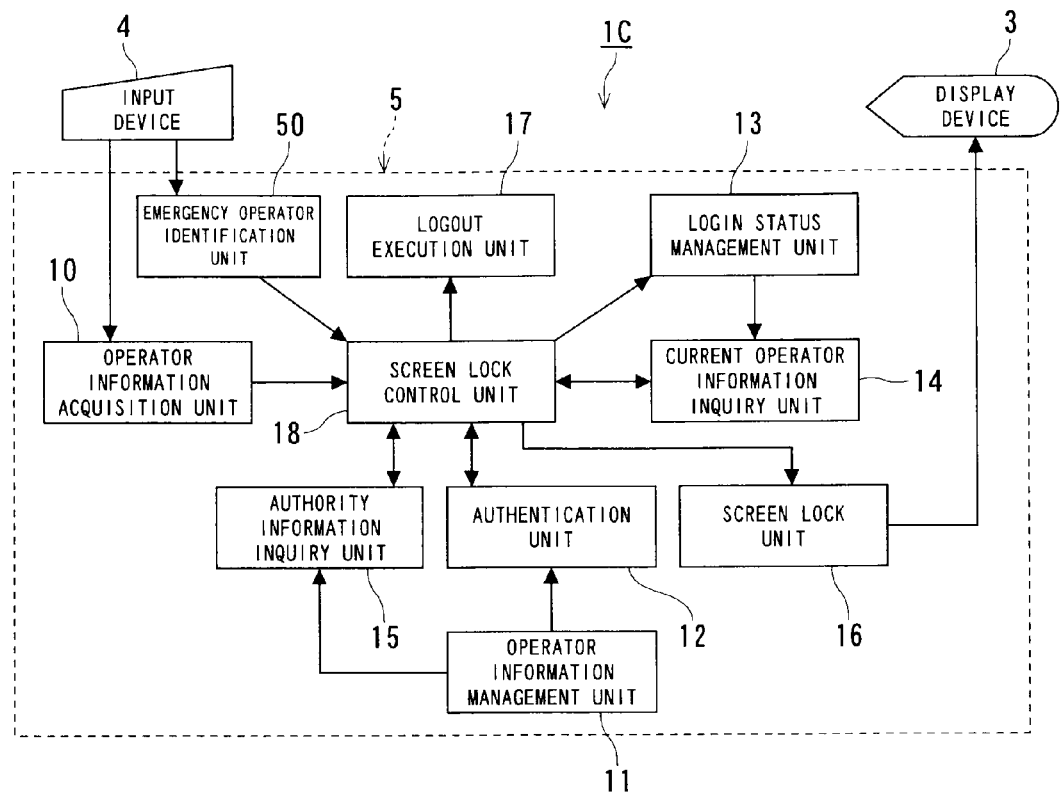
FIG. 11 is a functional block diagram of a security management system and a medical device according to a fourth embodiment of the present invention.

FIG. 11 is a functional block diagram of a security management system and a medical device according to a fourth embodiment of the present invention.

Referring to FIG. 11, a medical image diagnostic device 1C, serving as an example of the medical device, differs from the medical image diagnostic device 1 shown in FIG. 1 with respect to the following points: A security management system 6 includes an emergency operator identification unit 50. A screen lock control unit 18 includes another function. Since the other structure and operation are substantially the same as those of the medical image diagnostic device 1 in FIG. 1, only the functional block diagram of the security management system 6 is shown. The same components as those of the medical image diagnostic device 1 are designated by the same reference numerals and a description of the previously explained components is omitted.

When the medical image diagnostic device 1 to 1B are exceptional, an emergency and so on not to have time to release or login in the screen lock status or the logout status is effective in the medical image diagnostic device 1C.

In the medical image diagnostic device 1C, the security management system 6 includes the emergency operator identification unit 50. The emergency operator identification unit 50 has a function of acquiring emergency operator information indicating that an operator is an emergency operator in addition to or as an instruction for a release or a login instruction from an input device 4. The emergency operator identification unit 50 further has a function of transmitting the obtained instruction for a release or login instruction to the screen lock control unit 18.

In addition to the same functions as those in the foregoing medical image diagnostic device 1 shown in FIG. 1, the screen lock control unit 18 has a function of, when receiving a instruction for a release from the emergency operator identification unit 50, transmitting the instruction for a release to a screen lock unit 16 to allow the medical image diagnostic device 1C to change from the screen lock status to a status permitted part of operation and, when receiving a login instruction from the emergency operator identification unit 50, transmitting the login instruction to the screen lock unit 16 to allow the medical image diagnostic device 1C to change from the logout status to the status permitted part of operation.

Preferably, the screen lock unit 16 generates screen to release screen lock information or login screen information so that when an operator enters emergency operator information indicating that the operator is an emergency operator using the input device 4, the operator can instruct to release a screen lock or to log in.

Figure 12:
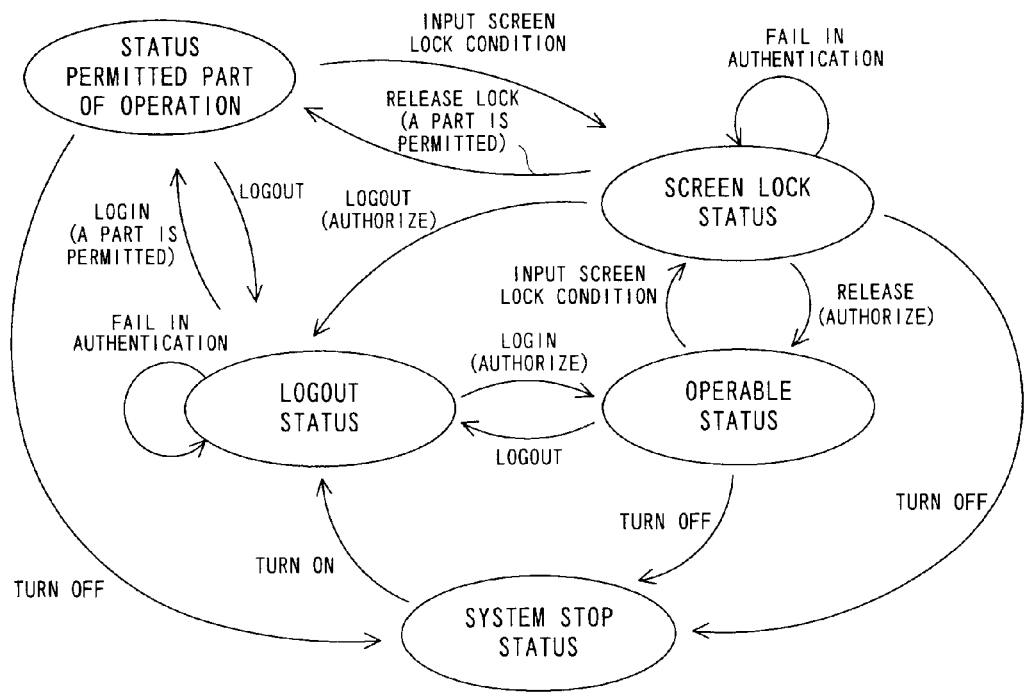
FIG. 12 is a status transition diagram of the medical image diagnostic device shown in FIG. 11.

FIG. 12 is a status transition diagram of the medical image diagnostic device 1C shown in FIG. 11.

Referring to FIG. 12, the status transition of the medical image diagnostic device 1C differs from that of the foregoing medical image diagnostic device 1 in FIG. 2 with respect to the point that the screen lock status or the logout status transits to the status permitted part of operation.

The operation of the medical image diagnostic device 1C will now be described.

Figure 13:
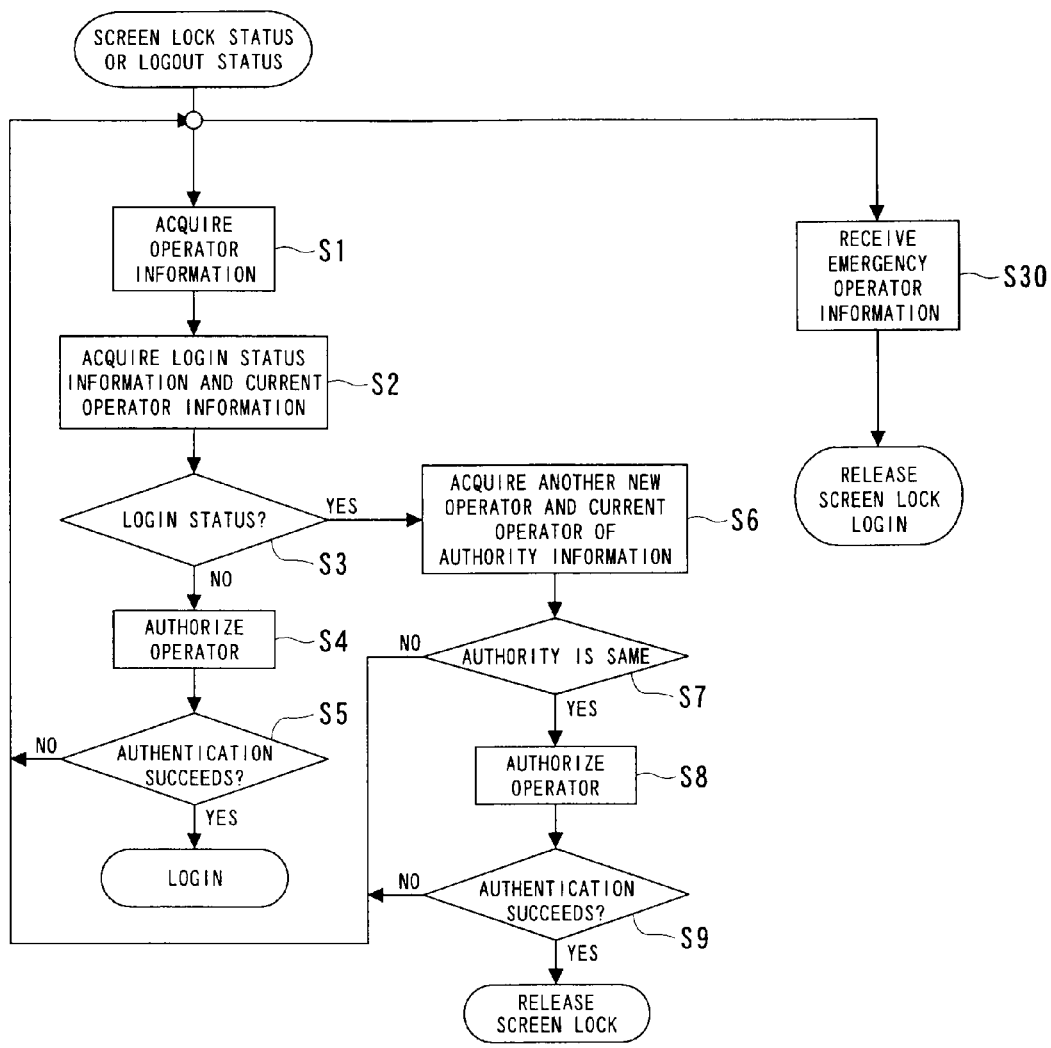
FIG. 13 is a flowchart of a process of controlling the status of the medical image diagnostic device through the security management system of the device in FIG. 11 and allowing the device to change from the screen lock status or the logout status to the operable status.

FIG. 13 is a flowchart of a process of controlling the status of the medical image diagnostic device 1C through the security management system 6 of the device 1C in FIG. 11 and allowing the device 1C to change from the screen lock status or the logout status to the operable status or status permitted part of operation. In FIG. 13, each reference numeral with a character "S" denotes a step of the flowchart. The same steps as those in FIG. 4 are designated by the same reference numerals and a description of the previously explained steps is omitted.

In the medical image diagnostic device 1C, in the screen lock status or the logout status, so long as an operator enters emergency operator information indicating that the operator is an emergency operator using the input device 4, the operator can instruct to release the screen lock or to log in.

Figure 14:
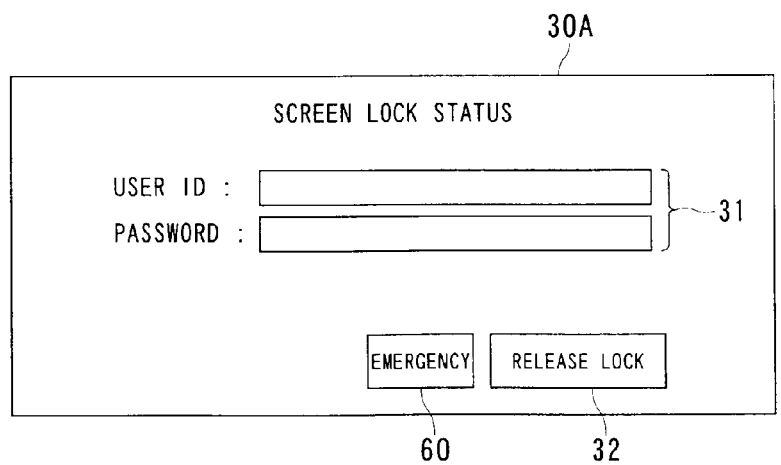
FIG. 14 shows an example of a screen to release screen lock displayed on a display device of the medical image diagnostic device shown in FIG. 11.

FIG. 14 shows an example of a screen to release screen lock displayed on a display device 3 of the medical image diagnostic device 1C shown in FIG. 11. The same portions as those in FIG. 8 are designated by the same reference numerals.

The screen lock unit 16 displays a screen to release screen lock 30A as shown in, e.g., FIG. 14, on the display device 3. The screen to release screen lock 30A includes an operator information entry field 31 where the user ID and password of an operator are entered and a release button 32 to issue an instruction for a release. The screen to release screen lock 30A further includes an emergency button 60 to input emergency operator information indicating that an operator is an emergency operator.

An emergency operator can press the emergency button 60 in the screen to release screen lock 30A without entering the user ID and password using the input device 4. Consequently, emergency operator information is supplied from the input device 4 to the security management system 6.

A method for inputting emergency operator information is not limited to pressing the emergency button 60. For example, an operator may enter arbitrary characters, such as "emergency", or an arbitrary symbol instead of the user ID. Alternatively, an operator may simultaneously press several keys. As mentioned above, emergency operator information can be input in an arbitrary manner.

Emergency operator information can be entered in the login screen and be then supplied from the input device 4 to the security management system 6 in the same way as in the screen to release screen lock 30A.

In step S30, the emergency operator identification unit 50 receives emergency operator information from the input device 4 and transmits the obtained emergency operator information to the screen lock control unit 18. When receiving the emergency operator information from the emergency operator identification unit 50, the screen lock control unit 18 gives an instruction for a release or a login instruction to the screen lock unit 16, thus allowing the medical image diagnostic device 1C to change from the screen lock status or the logout status to the status permitted part of operation.

Consequently, if the medical image diagnostic device 1C is in the screen lock status, the screen lock is released. The emergency operator continues or temporarily terminates a process used by a current operator. After that, the emergency operator can partly operate the medical image diagnostic device 1C. If the medical image diagnostic device 1C is in the logout status, the emergency operator can log in and then partly operate the medical image diagnostic device 1C.

In other words, in the medical image diagnostic device 1C according to the present embodiment, in the screen lock status or the logout status, if an operator except an authorized operator has to urgently perform an examination, the operator is identified as an emergency operator, so that the emergency operator ca release the screen lock or log in.

As for general medical image diagnostic devices, if an examination has to be urgently performed. For example, an emergency case appears at the time of the absence of the registration operator that authority such as login authority is given, and an un-enrolled operator may examine it urgently. It may be examined urgently as much as an emergency case appears and there is no time to login and to release even if it is when there is a registration operator with other examples. The inspection which medical image diagnostic device was used for can't be done at all if the un-enrolled operator and the enrolled operator don't log in or release to the device according to the device 1 to 1B even if it is these cases. On the other hand, if this device depends, it can cope with emergency examination because it doesn't depend on a regular release action for unlocking the screen lock or a regular login action, and by only pushing the emergency button 60 an release from screen lock or a login can be done simply. But, it is decided that it permits only the operation of the non-participation in the individual information after an emergency button 60 is pushed because the simple way such as release from screen lock or login by the medical image diagnostic device 1C is in a hurry.

And, it can presume easily in the form of this execution when it isn't limited in that case but it is installed on the general-purpose computer though the case that the security management system 6 is installed on the medical image diagnostic device is explained. Furthermore, it is not required that the operator must do the release action from screen lock by the emergency button 60 indicated in the display device 3. In other words, the operator can do the release action from screen lock by the different button operation independent of the emergency button 60.

A security management system 6 may be installed on the computer that for example it is equipped with the car as a case that a security management system 6 is installed in the general-purpose computer. In this case, when a non-owner except for the owner registered in advance must move a car during the stop urgently, the emergency operator identification unit 70 acquires the emergency operator information of the effect that the non-owner is an emergency operator. The lock unit 16 detects the matter which satisfies the lock condition and transits a computer in the lock status in advance when the computer is in a login condition, while it transits a computer in the status permitted part of operation after giving the instruction for releasing the computer lock. Here the lock control unit 18 gives the instruction to unlock the part of lock party to the lock unit 16, when a lock control unit 18 acquires emergency operator information from the emergency operator identification unit 70. Therefore, the non-owner makes a computer the status permitted part of operation by the button operation, and the movement of the car of the constant distance are permitted from a position of a stop according to the security management system 6.

And, the security control system 6 may be installed in a system that for example it possesses individual information and so on. In this case, only an enrolled operator can usually take out individual information in the system. But, according to the security management system 6, an operator except for the enrolled operator makes a computer the status permitted part of operation by the button operation, and reading of some of the individual information in the system is permitted urgently, when a difficulty occurred in the system.

Therefore, according to the security management system 6 and a security management system and method for managing security, a security management such as a login and logout to the operation terminal and a release of a lock corresponding to a login authority of a user and a user group can be complemented, and a user doesn't go through the regular process, and he can use a part function of the operation terminal when it is exceptional.

Figure 15:
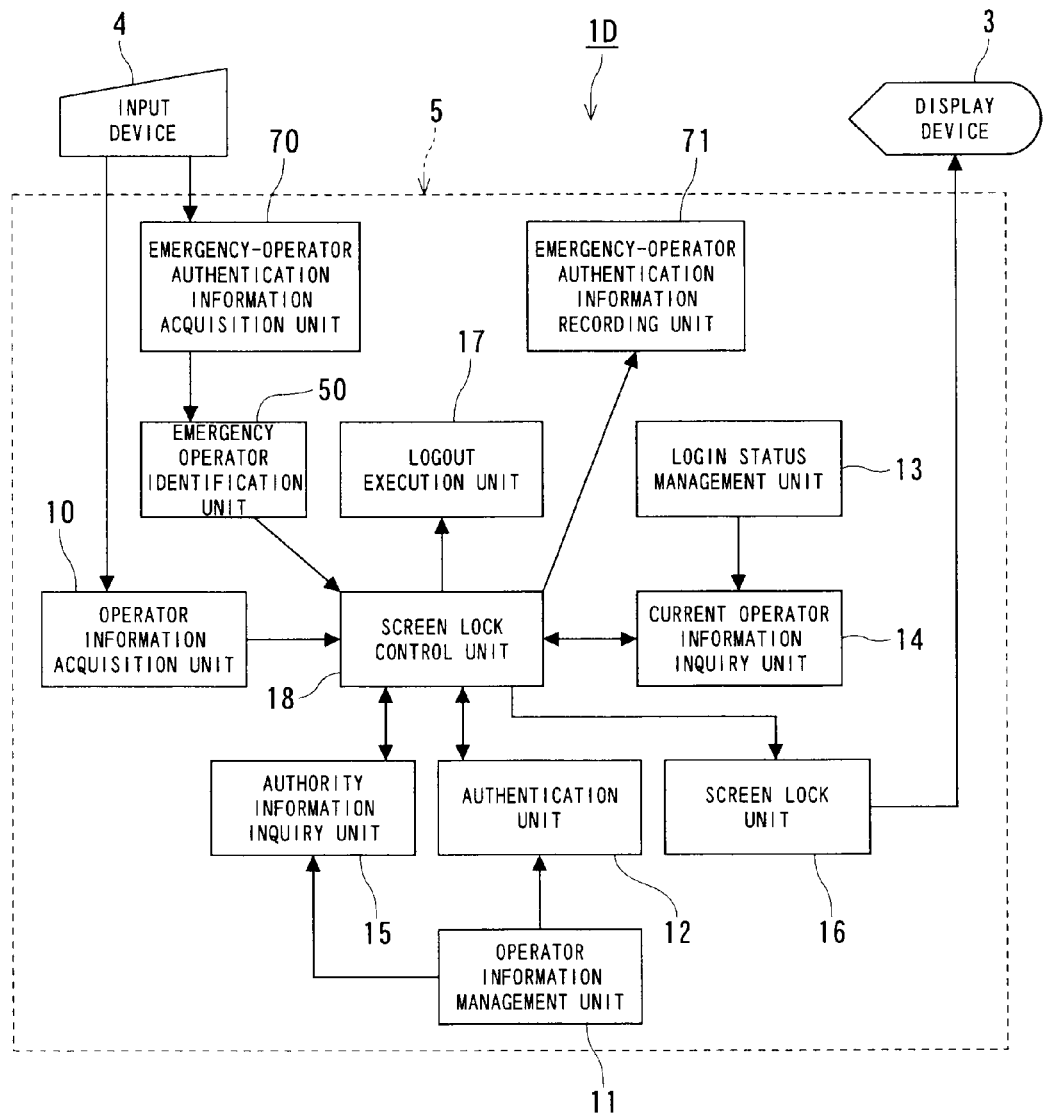
FIG. 15 is a functional block diagram of a security management system and a medical device according to a fifth embodiment of the present invention.

FIG. 15 is a functional block diagram of a medical device according to a fifth embodiment of the present invention.

Referring to FIG. 15, a medical image diagnostic device 1D, serving as an example of the medical device, differs from the foregoing medical image diagnostic device 1C shown in FIG. 11 with respect to the following points: A security management system 6 includes an emergency-operator authentication information acquisition unit 70 and an emergency-operator authentication information recording unit 71. Some components relating to the unit 70 and 71 each include further another function. Since the other structure and operation are substantially the same as those of the medical image diagnostic device 1C in FIG. 11, only the functional block diagram of the security management system 6 is shown. The same components as those of the medical image diagnostic device 1C are designated by the same reference numerals and a description of the previously explained components is omitted.

In other words, in the medical image diagnostic device 1D, the security management system 6 includes the emergency-operator authentication information acquisition unit 70 and the emergency-operator authentication information recording unit 71.

The emergency-operator authentication information acquisition unit 70 has a function of acquiring emergency-operator authentication information, which is necessary to authenticate an operator as an emergency operator, in addition to or as an instruction for a release from an input device 4 when the medical image diagnostic device 1D is in a screen lock status and also includes a function of transmitting the obtained emergency-operator authentication information and instruction for a release to an emergency operator identification unit 50. In addition, the emergency-operator authentication information acquisition unit 70 has a function of acquiring emergency-operator authentication information in addition to or as a login instruction from the input device 4 when the medical image diagnostic device 1D is in a logout status and further includes a function of transmitting the obtained emergency-operator authentication information and login instruction to the emergency operator identification unit 50.

As a method for generating emergency-operator authentication information, e.g., a method for assigning the common user ID and password to each emergency operator may be used.

Therefore, the emergency operator identification unit 50 transmits the emergency-operator authentication information received in addition to or as the instruction for a release, alternatively, the login instruction from the emergency-operator authentication information acquisition unit 70 to a screen lock control unit 18.

The screen lock control unit 18 includes a function of transmitting emergency-operator authentication information received from the emergency operator identification unit 50 to an authentication unit 12 to request the transmission of authentication result information indicating whether an emergency operator has the authority to release a screen lock or log in and then receiving the authentication result information from the authentication unit 12. The screen lock control unit 18 further includes a function of writing emergency-operator authentication information in the emergency-operator authentication information recording unit 71 when it is determined that authentication with respect to an emergency operator succeeds and then transmitting an instruction for a release or a login instruction received from the emergency operator identification unit 50 to a screen lock unit 16 to allow the medical image diagnostic device 1D to change from the screen lock status or the logout status to an operable status.

Accordingly, the emergency-operator authentication information obtained by the emergency-operator authentication information acquisition unit 70 is recorded in the emergency-operator authentication information recording unit 71. The emergency-operator authentication information to be recorded in the emergency-operator authentication information recording unit 71 can include the date and time of release or login, attribute information, e.g., the name of an emergency operator, and arbitrary information, such as an e-mail address of the operator. Therefore, the screen lock unit 16 can request the transmission of information to be included in emergency-operator authentication information in the screen to release screen lock or the login screen as necessary and acquire the information from the input device 4 through the emergency-operator authentication information acquisition unit 70.

The operation of the medical image diagnostic device 1D will now be described.

Figure 16:
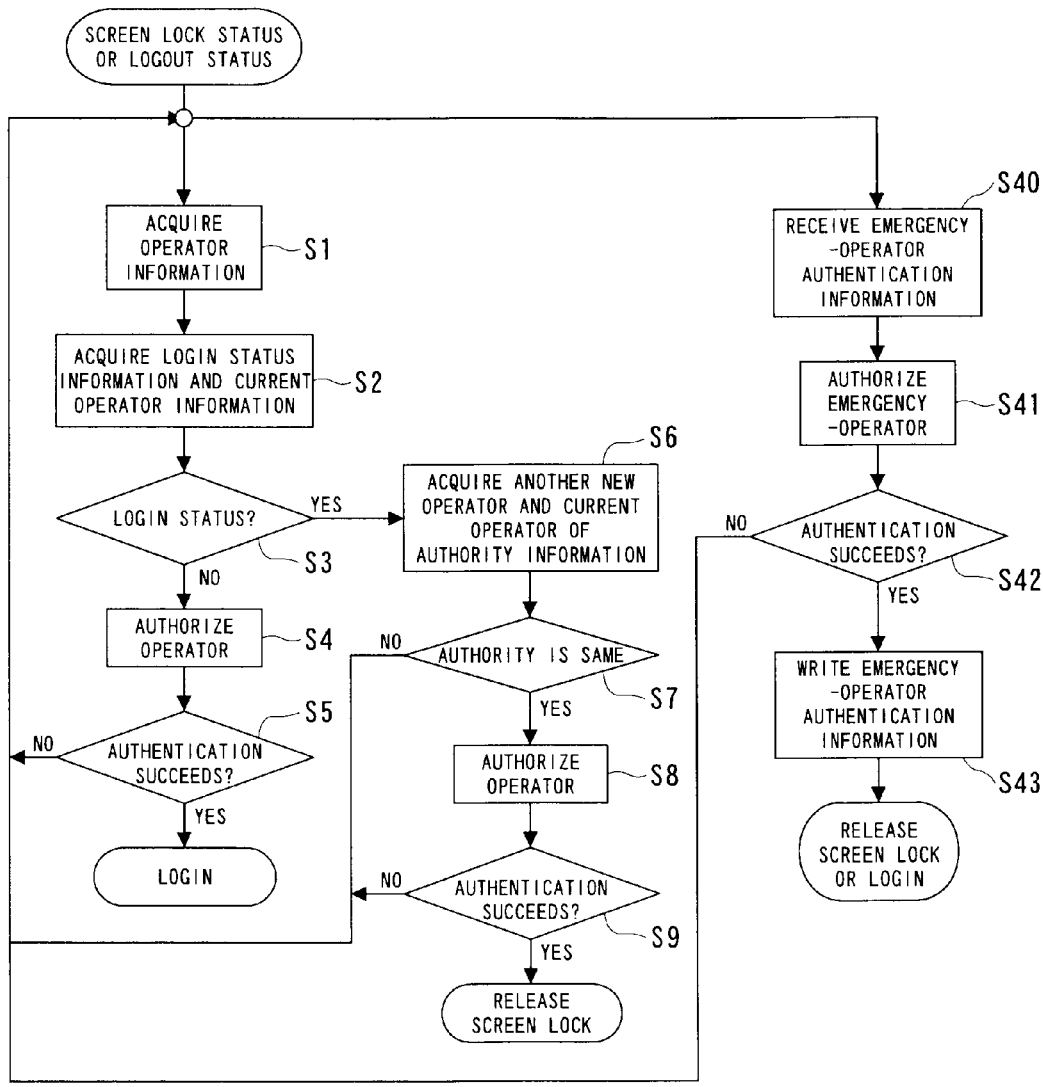
FIG. 16 is a flowchart of a process of controlling the status of the medical image diagnostic device through the security management system of the device in FIG. 15 and allowing the device to change from the screen lock status or the logout status to the operable status.

FIG. 16 is a flowchart of a process of controlling the status of the medical image diagnostic device 1D through the security management system 6 of the device 1D in FIG. 15 and allowing the device 1D to change from the screen lock status or the logout status to the operable status. In FIG. 16, each reference numeral with a character "S" denotes a step of the flowchart. The same steps as those in FIG. 13 are designated by the same reference numerals and a description of the previously explained steps is omitted.

The screen lock unit 16 displays a screen to release screen lock 30A as shown in, e.g., FIG. 14, on a display device 3. The screen to release screen lock 30A includes an operator information entry field 31, where the user ID and password of an operator are entered, and a release button 32 to issue an instruction for a release. The screen to release screen lock 30A further includes an emergency button 60 that is pressed when an operator is an emergency operator.

An emergency operator can enter the common user ID and password in the screen to release screen lock 30A using the input device 4 and press the emergency button 60. Consequently, the input device 4 transmits emergency-operator authentication information and an instruction for a release to the security management system 6. The security management system 6 determines that the information received from the input device 4 is emergency-operator authentication information and then supplies the received information to the emergency-operator authentication information acquisition unit 70.

Incidentally, when the emergency operator similarly enters data in a login screen, emergency-operator authentication information and a login instruction can be supplied from the input device 4 to the security management system 6.

In step S40, the emergency-operator authentication information acquisition unit 70 receives the emergency-operator authentication information and the instruction for a release (or the login instruction) from the input device 4 and then transmits the obtained information and instruction to the screen lock control unit 18.

In step S41, the screen lock control unit 18 supplies the received emergency-operator authentication information to the authentication unit 12 to request the transmission of authentication result information indicating whether the emergency operator has the authority to release the screen lock or log in and then receives the authentication result information from the authentication unit 12.

In step S42, the screen lock control unit 18 determines whether authentication with respect to the emergency operator succeeds with reference to the authentication result information received from the authentication unit 12. When determining that the authentication fails, the screen lock control unit 18 does not execute processing. Therefore, the medical image diagnostic device 1D maintains the screen lock status or the logout status.

On the contrary, when determining that the authentication succeeds, in step S43, the screen lock control unit 18 writes the emergency-operator authentication information in the emergency-operator authentication information recording unit 71 to store the emergency-operator authentication information.

Then, the screen lock control unit 18 supplies the instruction for a release (or the login instruction) received from the emergency operator identification unit 50 to the screen lock unit 16, thus allowing the medical image diagnostic device 1D to change from the screen lock status or the logout status to the operable status. Consequently, when the device 1D is in the screen lock status, the screen lock is released and the emergency operator continues or temporarily terminates a process used by a current operator. After that, the emergency operator can operate the medical image diagnostic device 1D. On the other hand, when the device 1D is in the logout status, the emergency operator can log in and operate the medical image diagnostic device 1D.

In other words, according to the present embodiment, when the above-mentioned medical image diagnostic device 1D is in the screen lock status or the logout status, so long as an operator except an authorized operator has to urgently perform an examination and is authenticated as an emergency operator, the operator is identified as the emergency operator and is permitted to release the screen lock or log in.

In the foregoing medical image diagnostic device 1C shown in FIG. 11, in the screen lock status or the logout status, anybody who is an emergency operator is permitted to release the screen lock or log in. In some cases, preferably, specific limited persons may be authorized to release the screen lock or log in. According to the present embodiment, the medical image diagnostic device 1D is constructed such that an emergency operator is authenticated. Advantageously, in addition to advantages similar to those of the medical image diagnostic device 1C in FIG. 11, security management responding to demands specific to medical services with more reliability can be ensured.

In addition, since emergency-operator authentication information can be recorded, the fact that an emergency operator has logined or released the screen lock can be confirmed later. In particular, when attribute information, e.g., the name of the emergency operator, or information regarding the emergency operator's e-mail address is recorded, who is the emergency operator can be recognized.

The above-mentioned medical image diagnostic devices 1, 1A, 1B, 1C, and 1D according to the respective embodiments may be combined. The components, functions, and processing steps of those devices may be partially omitted.

A method for unlocking the screen lock that is applied to a modification of each embodiment will now be described. Since the method is common to the modifications of the first to fifth embodiments, the modification of the medical image diagnostic device 1 according to the first embodiment will now be described as an example.

According to the modification of the first embodiment, a screen lock control unit 18 can further include a function of controlling the operating screen. When an operator releases a screen lock, an operating screen mode can be switched between the following modes in accordance with a predetermined condition: In the first mode, the operating screen used by a current logined operator, i.e., the screen displayed before being locked is continuously displayed. In the second mode, a new operating screen is created and is then displayed.

When the screen lock is released, therefore, the screen lock control unit 18 functions as follows: The screen lock control unit 18 compares authority information regarding the operator with that regarding the current operator. If the predetermined condition is satisfied, the screen lock control unit 18 performs the control operation such that the operating screen used by the current operator is continuously displayed on a display device 3 and supplies an instruction for a release to a screen lock unit 16. If the predetermined condition is not satisfied, the screen lock control unit 18 performs the control operation such that a new operating screen is displayed on the display device 3 and supplies the instruction for a release to the screen lock unit 16.

For example, when a new operator tries to release the screen lock, so long as authority information regarding the new operator is substantially the same as that regarding the current operator, the operating screen used by the current operator, i.e., the operating screen displayed before being locked is continuously displayed. On the other than, if the new operator is authorized to release the screen lock but the authority information regarding the operator is not substantially the same as that regarding the current logined operator, a new operating screen is generated and displayed.

Figure 17:
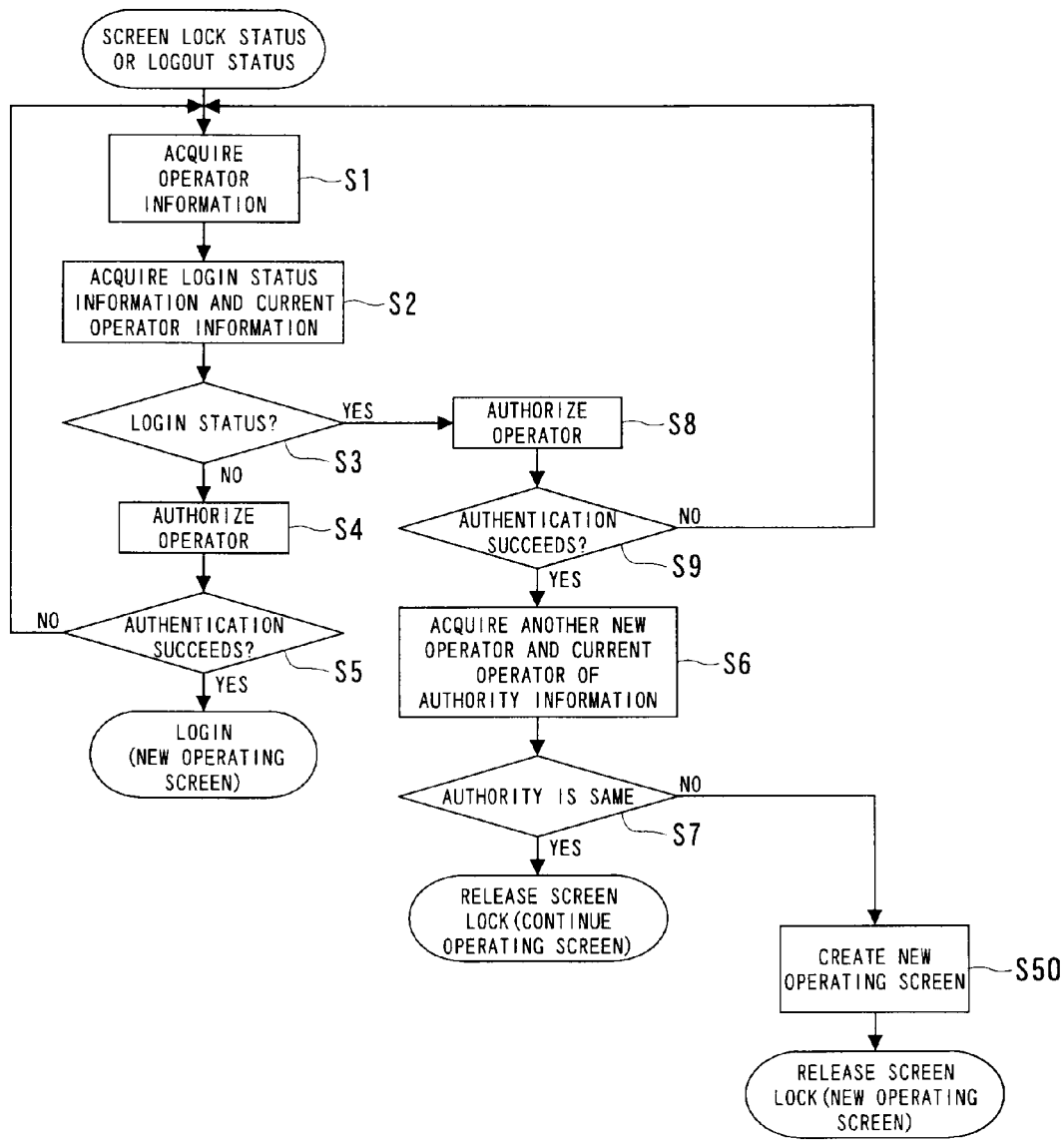
FIG. 17 is a flowchart of security management in a case that the operating screen can be controlled upon when releasing the screen lock in the medical image diagnostic device shown in FIG. 1 according to the modification of the first embodiment.

FIG. 17 is a flowchart of security management in a case that the operating screen can be controlled when unlocking the screen lock in the medical image diagnostic device 1 shown in FIG. 1 according to the modification of the first embodiment. In FIG. 17, each reference numeral with a character "S" denotes a step of the flowchart. The same steps as those in FIG. 4 are designated by the same reference numerals and a description of the previously explained steps is omitted.

In a manner similar to FIG. 4, in step S3, the screen lock control unit 18 determines whether the medical image diagnostic device 1 is currently in a login status. When determining that the device 1 is in the login status, i.e., when it is in the screen lock status, steps S8, S9, S6, and S7 are executed in that order different from that in FIG. 4. In other words, in step S8, an operator is authenticated based on operator information. In step S9, whether authentication succeeds is determined. If the authentication fails, the screen lock control unit 18 does not perform processing and allows the medical image diagnostic device 1 to maintain the screen lock status.

On the other hand, if the authority information regarding the operator includes predetermined authorities, e.g., the authority to login and that to release the screen lock, and the authentication succeeds, in step S6, the authority information regarding the current operator and that regarding the new operator are acquired. In step S7, the screen lock control unit 18 compares the authority information regarding the current operator with that regarding the new operator.

In this instance, when determining that the authority information regarding the current operator is substantially the same as that regarding the new operator, e.g., when the authority to use applications of the current operator is the same as that of the new operator, the screen lock control unit 18 supplies an instruction for a release to the screen lock unit 16, thus the screen lock is unlocked. At that time, the display device 3 continuously displays the operating screen operated by the current operator, i.e., the screen displayed before being locked.

On the other hand, when determining that the authority information regarding the current operator is not substantially the same as that regarding the new operator, e.g., when the new operator is authorized to log in but does not have the same authority to use the applications as that of the current operator, in step S50, the screen lock control unit 18 creates a new operating screen to be displayed on the display device 3 after the screen lock is released. After that, the screen lock control unit 18 supplies the instruction for a release to the screen lock unit 16, thus the screen lock is unlocked. Consequently, the display device 3 displays a new operating screen.

As mentioned above, in the case where the screen lock control unit 18 includes the operating screen control function, if an operator different from a current operator releases the screen lock, so long as the authority information regarding the operator is the same as that regarding the current operator, the operator can use an examination application while the operating screen is continuously being displayed. Thus, time required to restart the examination application is not needed. An examination can be started immediately.

Even when the authority information regarding the operator who releases the screen lock is different from that regarding the current operator, so long as the authority information regarding the operator includes the authority to log in, the operator ca release the screen lock to display a new operating screen, start a target application in the new operating screen, and use the application.

What is claimed is:

1. A medical device having an operating terminal that includes an input device and a display device, comprising:
 a recognition unit configured to recognize an emergency when an interactive emergency button displayed on the display device is pushed by an operator by use of the input device; and
 a releasing unit configured to release a screen lock of the operating terminal in case of the emergency, wherein the screen lock restricts access to functionality of the operating terminal, so that an examination of an object is executed by input from the input unit, in case of the emergency.

2. The medical device according to claim 1, wherein
 the recognition unit is configured to recognize login input by the operator by use of the input device or the emergency, and
 the releasing unit is configured to release all of the screen lock of the operating terminal in case of the login, and to release a part of the screen lock of the operating terminal in case of the emergency.

3. The medical device according to claim 1, further comprising:
 a requiring unit configured to require an input about a name of the operator who will push the emergency button; and
 a registering unit configured to register the input name in response to the emergency button being pushed.

4. A control method of a medical device having an operating terminal that includes an input device and a display device, comprising:
 recognizing an emergency when an interactive emergency button displayed on the display device is pushed by an operator by use of the input device; and
 releasing a screen lock of the operating terminal in case of the emergency, wherein the screen lock restricts access to functionality of the operating terminal, so that the medical device is controlled so as to execute an examination of an object by input from the input device, in case of the emergency.

5. The control method according to claim 4, wherein
 the recognizing recognizes login input by the operator by use of the input device or the emergency, and
 the releasing releases all of the screen lock of the operating terminal in case of the login, and releases a part of the screen lock of the operating terminal in case of the emergency.

6. The control method according to claim 4, further comprising:
   requiring an input about a name of the operator who will push the emergency button; and
   registering the input name in response to the emergency button being pushed.

* * * * *